United States Patent [19]

Goto et al.

[11] Patent Number: 5,053,471

[45] Date of Patent: Oct. 1, 1991

[54] TRANSPARENT RESIN MATERIAL

[75] Inventors: Kohei Goto; Zen Komiya; Noboru Yamahara; Akira Iio, all of Yokkaichi, Japan

[73] Assignee: Japan Synthetic Rubber Co., Ltd., Tokyo, Japan

[21] Appl. No.: 613,939

[22] Filed: Nov. 13, 1990

Related U.S. Application Data

[63] Continuation of Ser. No. 270,631, Nov. 14, 1988, abandoned.

[30] Foreign Application Priority Data

Nov. 17, 1987 [JP] Japan ............... 62-288527
Nov. 17, 1987 [JP] Japan ............... 62-288528

[51] Int. Cl.$^5$ ........................... C08F 232/00
[52] U.S. Cl. ........................ 526/281; 526/169; 525/338
[58] Field of Search ........... 526/169, 281; 525/338

[56] References Cited

U.S. PATENT DOCUMENTS 4,068,063  1/1978  Ikeda et al. ................. 526/281

FOREIGN PATENT DOCUMENTS

| 226954 | 7/1987 | European Pat. Off. . |
| 313838 | 5/1989 | European Pat. Off. . |
| 2444681 | 3/1975 | Fed. Rep. of Germany . |
| 2540553 | 3/1977 | Fed. Rep. of Germany . |
| 2249913 | 5/1975 | France . |
| 0026024 | 2/1985 | Japan . |
| 1456597 | 11/1976 | United Kingdom . |

OTHER PUBLICATIONS

Patent Abstracts of Japan, DT 2,540,533.
Patent Abstracts of Japan, vol. 3, JP-A-52 155,617.

*Primary Examiner*—Joseph L. Schofer
*Assistant Examiner*—Alex H. Walker
*Attorney, Agent, or Firm*—Oblon, Spivak, McClelland, Maier & Neustadt

[57] ABSTRACT

A transparent resin material consisting of a (co)polymer obtained by subjecting at least one compound represented by the general formula (I) or a combination of said compound and other copolymerizable monomer to metathesis polymerization, or a hydrogenation product of the (co)polymer:

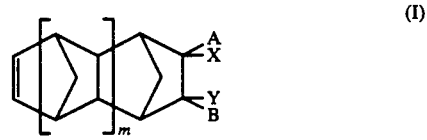

wherein A and B are independently hydrogen atoms or $C_{1-10}$ hydrocarbon groups; X and Y are independently hydrogen atoms, $C_{1-10}$ hydrocarbon groups, halogen atoms, halogen-substituted $C_{1-10}$ hydrocarbon groups, $-(CH_2)_nCOOR^1$, $-(CH_2)_nOCOR^1$, $-(CH_2)_nOR^1$, $-(CH_2)_nCN$, $-(CH_2)_nCONR^2R^3$, $-(CH_2)_nCOOZ$, $-(CH_2)_nOCOZ$, $-(CH_2)_nOZ$ or $-(CH_2)_nW$ [$R^1$, $R^2$, $R^3$ and $R^4$ are independently $C_{1-20}$ hydrocarbon groups, Z is a halogen-substituted hydrocarbon group, W is $SiR^5_pD_{3-p}$ ($R^5$ is a $C_{1-10}$ hydrocarbon group, D is a halogen atom, $-OCOR^5$ or $-OR^5$, p is 0 or an integer of 1-3), n is 0 or an integer of 1-10] with the proviso that at least one of X and Y is selected from the above groups other than the hydrogen atom and the hydrocarbon groups, or X and Y may form together

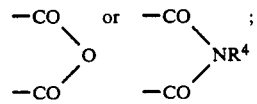

and m is 0 or 1. Said transparent resin material is moldable and has sufficient optical properties, low hygroscopicity, good heat resistance and excellent adhesion to recording layer.

10 Claims, No Drawings

TRANSPARENT RESIN MATERIAL

This application is a continuation of application Ser. No. 07/270,631, filed on Nov. 14, 1988, now abandoned.

This invention relates to a transparent resin material which enables the production of various transparent resin molded articles and which is preferably used in the production of video disk, compact disk, overwritable optical disk, storable, erasable and regeneratable optical disk, optical lens, etc.

In recent years, transparent resins have been used as a molding material for automobile parts, lighting appliances, electrical parts, sundry goods, etc. in which ordinary transparency is required Further, the transparent resins have been applied as an optical material in which optical properties are important. Optical materials are required to have not only transparency but also other important properties which conventional transparent resins have been unable to satisfy.

As the material for optical disk substrate which is an example of optical materials, there are known a polycarbonate resin, a polymethyl methacrylate resin, a polycyclohexyl methacrylate resin, a copolymeric resin of an alkyl methacrylate and methyl methacrylate, styrene, or other monomer, a (co)polymer of a bulky ester group-containing methacrylic acid ester, a copolymer obtained by copolymerizing ethylene and a norbornene type hydrocarbon compound using a Ziegler-Natta catalyst [Japanese patent application Kokai (Laid-Open) No. 292,601/86], a (co)polymer which is a hydrogenation product of a (co)polymer obtained by subjecting a tetracyclododecene type hydrocarbon compound or a norbornene type hydrocarbon compound to ring opening (co)polymerization using a metathesis catalyst [Japanese patent application Kokai (Laid-Open) No. 26,024/85] and a ring opening (co)polymer of a polar substituent-containing norbornene derivative [Japanese Patent Application Kokai (Laid-Open) Nos. 19,801/87 and 19,802/87].

The above transparent resin materials, however, do not satisfy all of the birefringence, low hygroscopicity, mechanical strengths and adhesion to recording layer which are high requirements for a material for optical disk substrate.

For example, the polystyrene resin and the polycarbonate resin both having high birefringence give many errors during the regeneration of stored information by laser beam. The polymethyl methacrylate resin having high hygroscopicity is deformed owing to moisture absorption, to cause many errors during the regeneration of stored information and also is very likely to cause a property change of the recording film due to moisture absorption. The polycyclohexyl methacrylate resin has a low glass transition temperature, so it has low heat resistance. The copolymer of polycyclohexyl methacrylate and methyl methacrylate has high hygroscopicity. The copolymer of polycyclohexyl methacrylate and styrene has high birefringence and accordingly poor optical properties.

The (co)polymer of a norbornene type hydrocarbon obtained by polymerization using a Ziegler-Natta catalyst, a homopolymer of a tetracyclododecene type hydrocarbon compound obtained by metathesis ring opening polymerization or a hydrogenation product of the (co)polymer of norbornene type hydrocarbon has improved birefringence, hygroscopicity and heat resistance but has poor adhesion to recording layer because they have no polar group contributing to adhesion.

The optical material consisting of a ring opening (co)polymer of a polar substituent-containing norbornene derivative is improved in adhesion to recording layer because of the polar substituent but is unable to satisfy both high glass transition temperature and low water absorption because when a polar substituent giving a high transition temperature is selected the saturated water-absorption becomes high and when a polar substituent giving a low saturated water-absorption is selected the glass transition temperature becomes low. Further, this optical material has a problem that the durability for a long period is not sufficient because it contains unsaturated double bonds in the polymer structure.

Thus, substantially no satisfactory materials have existed as a transparent resin material which has sufficient optical properties, low hygroscopicity, good heat resistance and excellent adhesion to recording layer (i.e. durability).

The present inventors have made extensive research on a metathesis ring opening (co)polymer as a transparent resin material and have consequently found that a metathesis ring opening (co)polymerization of a polar substituent-containing tetracyclododecene derivative results in a (co)polymer satisfying the requirements that have not been satisfied by the metathesis ring opening (co)polymer of a norbornene derivative, especially that the optical material has both high glass transition temperature and low water absorption.

It is an object of this invention to provide a transparent resin material having excellent optical properties, low hygroscopicity and good heat resistance.

It is another object of this invention to provide a process for producing a transparent resin material.

Other objects and advantages of this invention will become apparent from the following description.

According to this invention, there is provided a transparent resin material consisting of a (co)polymer obtained by subjecting at least one compound represented by the following general formula (I) or a combination of said compound with other copolymerizable monomer to metathesis polymerization, or a hydrogenation product of said (co)polymer:

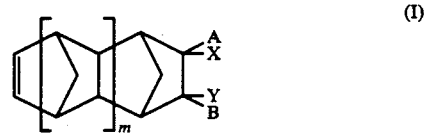

wherein A and B are independently hydrogen atoms or hydrocarbon groups of 1–10 carbon atoms, preferably 1–6 carbon atoms, more preferably 1–2 carbon atoms (it is particularly preferable that one of A and B is H and the other is $CH_3$); X and Y are independently hydrogen atoms, $C_{1-10}$hydrocarbon groups, halogen atoms, halogen-substituted $C_{1-10}$hydrocarbon groups, $-(CH_2)_nCOOR^1$, $-(CH_2)_nOCOR^1$, $-(CH_2)_nOR^1$, $-(CH_2)_nCN$, $-(CH_2)_nCONR^2R^3$, $-(CH_2)_nCOOZ$, $-(CH_2)_nOCOZ$, $-(CH_2)_nOZ$ or $-(CH_2)_nW$ [$R^1$, $R^3$, and $R^4$ are independently $C_{1-20}$hydrocarbon groups, Z is a halogen-substituted hydrocarbon group, W is $SiR^5_pD_{3-p}$ ($R^5$ is a $C_{1-10}$hydrocarbon group, D is a halogen atom, $-OCOR^5$ or $-OR^5$, p is 0 or an integer of 1–3), n is 0 or an integer of 1–10] with the proviso that at least one of X and Y is selected from the above groups other than the hydrogen atom and the hydrocarbon groups, or X and Y may form together

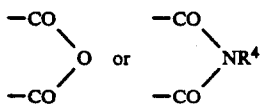

($R^4$ is as defined above); and m is 0 or 1 and is preferably 1 in view of higher heat resistance.

This invention further provides a process for producing a transparent resin material comprising subjecting a compound of the general formula (I) or a combination of said compound and other copolymerizable monomer to ring opening polymerization with a catalyst consisting of a combination of (a) at least one member selected from the group consisting of compounds of W, Mo and Re and (b) at least one member selected from the group consisting of compounds of elements of the Ia, IIa, IIb, IIIa, IVa and IVb Groups of the Deming Periodic Table.

In the general formula (I), the substituents A and B are preferably hydrocarbon groups for obtaining lower water absorption. However, when the hydrocarbon group has too many carbon atoms the heat resistance becomes inferior. Further, it is desirable to consider ease of monomer synthesis in the selection of the number of carbon atoms. Especially preferably, one of A and B is a methyl group and the other is a hydrogen atom in view of the balance of the ease of monomer synthesis and low water absorption.

The substituents X and Y are preferably selected from the group consisting of a hydrogen atom, a $C_{1-10}$hydrocarbon group, $-(CH_2)_nCOOR^1$ and $-(CH_2)_nOCOR^1$. More preferably, one of X and Y is selected from a hydrogen atom and a $C_{1-10}$hydrocarbon group and the other is selected from $-(CH_2)_nCOOR^1$ and $-(CH_2)_nOCOR^1$. Especially preferably, one is a hydrogen atom and the other is $-COOR^1$ or $-OCOR^1$ ($R^1$ is a $C_{1-4}$alkyl group or a $C_{5-20}$cyclic hydrocarbon group).

The substituents X and Y are preferably ester groups in order to secure adhesion of resin surface without increasing water absorption excessively. More preferably, one of X and Y is a hydrocarbon group or a hydrogen atom and the other is an ester group to further reduce water absorption. It is especially preferable that one of X and Y be a hydrogen atom from the viewpoint of ease of synthesis and the ester group has n being 0 for the purpose of enhancing the heat resistance. On the other hand, it is preferable that the $R^1$ group in the ester group be a hydrocarbon group having more carbon atoms for lowering the water absorption, while the $R^1$ group be a hydrocarbon group having less carbon atoms for enhancing the heat resistance. In order to balance the contradictory properties, it is preferable that the number of carbon atoms be 1 to 4.

The optimum compound of the general formula (I) are those where $m=1$, $A=H$, $B=CH_3$ or H, $X=H$ and $Y=COOCH_3$ or $COOC_2H_5$.

Specific examples of the tetracyclododecene derivative of the general formula (I) where $m=1$ include the followings:

8-methoxycarbonyltetracyclo[$4.4.0.1^{2,5}.1^{7,10}$]-3-dodecene,
8-ethoxycarbonyltetracyclo[$4.4.0.1^{2,5}$]-3-dodecene,
8-n-propoxycarbonyltetracyclo[$4.4.0.1^{2,5}.1^{7,10}$]-3-dodecene,
8-isopropoxycarbonyltetracyclo[$4.4.0.1^{2,5}.1^{7,10}$]-3-dodecene,
8-n-butoxycarbonyltetracyclo[$4.4.0.1^{2,5}.1^{7,10}$]-3-dodecene,
8-isobutoxycarbonyltetracyclo[$4.4.0.1^{2,5}.1^{7,10}$]-3-dodecene,
8-sec-butoxycarbonyltetracyclo[$4.4.0.1^{2,5}.1^{7,10}$]-3-dodecene,
8-t-butoxycarbonyltetracyclo[$4.4.0.1^{2,5}.1^{7,10}$]-3-dodecene,
8-phenyloxycarbonyltetracyclo[$4.4.0.1^{2,5}.1^{7,10}$]-3-dodecene,
8-methyl-8-methoxycarbonyltetracyclo[$4.4.0.1^{2,5}.1^{7,10}$]-3-dodecene,
8-methyl-8-ethoxycarbonyltetracyclo[$4.4.0.1^{2,5}.1^{7,10}$]-3-dodecene,
8-methyl-8-n-propoxycarbonyltetracyclo[$4.4.0.1^{2,5}.1^{7,10}$]-3-dodecene,
8-methyl-8-isopropoxycarbonyltetracyclo[$4.4.0.1^{2,5}.1^{7,10}$]-3-dodecene,
8-methyl-8-n-butoxycarbonyltetracyclo[$4.4.0.1^{2,5}.1^{7,10}$]-3-dodecene,
8-methyl-8-sec-butoxycarbonyltetracyclo[$4.4.0.1^{2,5}.1^{7,10}$]-3-dodecne,
8-methyl-8-t-butoxycarbonyltetracyclo[$4.4.0.1^{2,5}.1^{7,10}$]-3-dodecene,
8-butoxycarbonyl-9-phenyltetracyclo[$4.4.0.1^{2,5}.1^{7,10}$]-3-dodecene,
8,9-dimethoxycarbonyltetracyclo[$4.4.0.1^{2,5}.1^{7,10}$]-3-dodecene,
8-cyclohexyloxycarbonyltetracyclo[$4.4.0.1^{2,5}.1^{7,10}$]-3-dodecene,
8-(4'-t-butylcyclohexyloxy)carbonyltetracyclo[$4.4.0.1^{2,5}.1^{7,10}$]-3-dodecene,
8-methyl-8-cyclohexyloxycarbonyltetracyclo[$4.4.0.1^{2,5}.1^{7,10}$]-3-dodecene,
8-methyl-8-(4'-t-butylcyclohexyloxy)carbonyltetracyclo[$4.4.0.1^{2,5}.1^{7,10}$]-3-dodecene,
8-menthyloxycarbonyltetracyclo[$4.4.0.1^{2,5}.1^{7,10}$]-3-dodecene,
8-methyl-8-menthyloxycarbonyltetracyclo[$4.4.0.1^{2,5}.1^{7,10}$]-3-dodecene,
8-bornyloxycarbonyltetracyclo[$4.4.0.1^{2,5}.1^{7,10}$]-3-dodecene,
8-methyl-8-bornyloxycarbonyl[$4.4.0.1^{2,5}.1^{7,10}$]-3-dodecene,
8-isobornyloxycarbonyl[$4.4.0.1^{2,5}.1^{7,10}$]-3-dodecene,
8-methyl-8-isobornyloxycarbonyl[$4.4.0.1^{2,5}.1^{7,10}$]-3-dodecene,
8-adamanthyloxycarbonyl[$4.4.0.1^{2,5}.1^{7,10}$]-3-dodecene,
8-methyl-8-adamanthyloxycarbonyl[$4.4.0.1^{2,5}.1^{7,10}$]-3-dodecene,
8-bicyclo[2.2.1]-2-heptyloxycarbonyl[$4.4.0.1^{2,5}.1^{7,10}$]-3-dodecene,
8-methyl-8-bicyclo[2.2.1]-2-heptyloxycarbonyl[$4.4.0.1^{2,5}.1^{7,10}$]-3-dodecene,
8-tetracyclo[$4.4.0.1^{2,5}.1^{7,10}$]-3-dodecyloxycarbonyl[$4.4.0.1^{2,5}.1^{7,10}$]-3-dodecene,
8-methyl-8-tetracyclo[$4.4.0.1^{2,5}.1^{7,10}$]-3-dodecyloxycarbonyl[$4.4.0.1^{2,5}.1^{7,10}$]-3-dodecene,
8-tricyclo[$5.2.1.0^{2,6}$]-8-decyloxycarbonyl[$4.4.0.1^{2,5}.1^{7,10}$]-3-dodecene,
8-methyl-8-tricyclo[$5.2.1.0^{2,6}$]-8-decyloxycarbonyl[$4.4.0.1^{2,5}.1^{7,10}$]-3-dodecene,
8-pentacyclo[$6.5.1.1^{3,6}.0^{2,7}.0^{9,13}$]-4-pentadecyloxycarbonyl[$4.4.0.1^{2,5}.1^{7,10}$]-3-dodecene,
8-methyl-8-pentacyclo[$6.5.1.1^{3,6}.0^{2,7}.0^{9,13}$]-4-pentadecyloxycarbonyl[$4.4.0.1^{2,5}.1^{7,10}$]-3-dodecene, 8-tricyclo[6.2.1.0$^{2,7}$]-9-undecyloxycarbonyl[4.4.0.1$^{2,5}$.1$^{7,10}$-3-dodecene,
8-methyl-8-tricyclo[6.2.1.0$^{2,7}$]-9-undecyloxycarbonyl[4.4.0.1$^{2,5}$.1$^{7,10}$-3-dodecene,
8-pentacyclo[6.6.1.1$^{3,6}$.0$^{2,7}$.0$^{9,14}$]-4-hexadecyloxycarbonyl-[4.4.0.1$^{2,5}$.1$^{7,10}$]-3-dodecene,
8-methyl-8-pentacyclo[6.6.1.1$^{3,6}$.0$^{2,7}$.0$^{9,14}$]-4-hexadecyloxycarbonyl]4.4.0.1$^{2,5}$.1$^{7,10}$]-3-dodecene,
8-acetoxytetracyclo[4.4.0.1$^{2,5}$.1$^{7,10}$]-3-dodecene,
8-cyanotetracyclo[4.4.0.1$^{2,5}$.1$^{7,10}$]-3-dodecene,
9-methyl-8-cyanotetracyclo[4.4.0.1$^{2,5}$.1$^{7,10}$]-3-dodecene,
8-methyl-8-cyanotetracyclo[4.4.0.1$^{2,5}$.1$^{7,10}$]-3-dodecene,
8,9-dimethyl-8,9-dicyanotetracyclo[4.4.0.1$^{2,5}$.1$^{7,10}$]-3-dodecene,
8-carbamoyltetracyclo[4.4.0.1$^{2,5}$.1$^{7,10}$]-3-dodecene,
8-N-methylcarbamoyltetracyclo[4.4.0.1$^{2,5}$.1$^{7,10}$]-3-dodecene,
8-N,N-diethylcarbamoyltetracyclo[4.4.0.1$^{2,5}$.1$^{7,10}$]-3-dodecene,
N,N,N',N'-tetramethyl-8,9-dicarbamoyltetracyclo[4.4.0.1$^{2,5}$.1$^{7,10}$]-3-dodecene,
8-chlorotetracyclo[4.4.0.1$^{2,5}$.1$^{7,10}$]-3-dodecene,
8-methyl-8-chlorotetracyclo[4.4.0.1$^{2,5}$.1$^{7,10}$]-3-dodecene,
8-chloromethyloxycarbonyltetracyclo[4.4.0.1$^{2,5}$.1$^{7,10}$]-3-dodecene,
8-dibromopropyloxycarbonyltetracyclo[4.4.0.1$^{2,5}$.1$^{7,10}$]-3-dodecene,
8-dichloropropyloxycarbonyltetracyclo[4.4.0.1$^{2,5}$.1$^{7,10}$]-3-dodecene,
8-chlorophenyloxycarbonyltetracyclo[4.4.0.1$^{2,5}$.1$^{7,10}$]-3-dodecene,
8-monobromophenyloxycarbonyltetracyclo[4.4.0.1$^{2,5}$.1$^{7,10}$]-3-dodecene,
8-tribromophenyloxycarbonyltetracyclo[4.4.0.1$^{2,5}$.1$^{7,10}$]-3-dodecene,
8,9-dichlorotetracyclo[4.4.0.1$^{2,5}$.1$^{7,10}$]-3-dodecene,
8-bromotetracyclo[4.4.0.1$^{2,5}$.1$^{7,10}$]-3-dodecene,
8-bromomethyltetracyclo[4.4.0.1$^{2,5}$.1$^{7,10}$]-3-dodecene,
8-tribromobenzyltetracyclo[4.4.0.1$^{2,5}$.1$^{7,10}$]-3-dodecene,
tetracyclo[4.4.0.1$^{2,5}$.1$^{7,10}$]-3-dodecene-8,9-dicarboxylic anhydride,
8,9-dimethyltetracylco[4.4.0.1$^{2,5}$.1$^{7,10}$]-3-dodecene-8,9-dicarboxylic anhydride,
tetracyclo[4.4.0.1$^{2,5}$.1$^{7,10}$]-3-dodecene-8,9-dicarboxylic acid imide,
N-phenyl-5-methyltetracyclo[4.4.0.1$^{2,5}$.1$^{7,10}$]-3-dodecene-8,9-dicarboxylic acid imide,
5-trichlorosilyltetracyclo[4.4.0.1$^{2,5}$.1$^{7,10}$]-3-dodecene,
5-(dimethylmethoxysilyl)tetracyclo[4.4.0.1$^{2,5}$.1$^{7,10}$]-3-dodecene,
8-(dimethylacetylsilyl)tetracyclo[4.4.0.1$^{2,5}$.1$^{7,10}$]-3-dodecene, and
8-trimethylsilyltetracyclo[4.4.0.1$^{2,5}$.1$^{7,10}$]-3-dodecene Specific examples of the bicyclo[2.2.1]-2-heptene which is a compound of the general formula (I) where $m=0$ include the followings:
5-methoxycarbonylbicyclo[2.2.1]-2-heptene,
5-ethoxycarbonylbicyclo[2.2.1]-2-heptene,
5-n-propoxycarbonylbicyclo[2.2.1]-2-heptene,
5-isopropoxycarbonylbicyclo[2.2.1]-2-heptene,
5-n-butoxycarbonylbicyclo[2.2.1]-2-heptene,
5-isobutoxycarbonylbicyclo[2.2.1]-2-heptene,
5-sec-butoxycarbonylbicyclo[2.2.1]-2-heptene,
5-tert-butoxycarbonylbicyclo[2.2.1]-2-heptene,
5-phenyloxycarbonylbicyclo[2.2.1]-2-heptene,
5-methyl-5-methoxycarbonylbicyclo[2.2.1]-2-heptene,
5-butoxycarbonyl-6-phenylbicyclo[2.2.1]-2-heptene,
5,6-dimethoxycarbonylbicyclo[2.2.1]-2-heptene,
5-cyclohexyloxycarbonylbicyclo[2.2.1]-2-heptene,
5-(4'-tert-butylcyclohexyloxy)carbonylbicyclo[2.2.1]-2-heptene,
5-methyl-5-cyclohexyloxycarbonylbicyclo[2.2.1]-2-heptene,
5-methyl-5-(4'-tert-butylcyclohexyloxy)carbonylbicyclo[2.2.1]-2-heptene,
5-menthyloxycarbonylbicyclo[2.2.1]-2-heptene,
5-methyl-5-menthyloxycarbonylbicyclo[2.2.1]-2-heptene,
5-bornyloxycarbonylbicyclo[2.2.1]-2-heptene,
5-methyl-5-bornyloxycarbonylbicyclo[2.2.1]-2-heptene,
5-isobornyloxycarbonylbicyclo[2.2.1]-2-heptene,
5-adamantyloxycarbonylbicyclo[2.2.1]-2-heptene,
5-methyl-5-adamantyloxycarbonylbicyclo[2.2.1]-2-heptene,
5-bicyclo[2.2.1]-2-heptyloxycarbonylbicyclo[2.2.1]-2-heptene,
5-methyl-5-bicyclo[2.2.1]-2-heptyloxycarbonylbicyclo[2.2.1]-2-heptene,
5-tetracyclo[4.4.0.1$^{2,5}$.1$^{7,10}$]-3-dodecyloxycarbonylbicyclo[2.2.1]-2-heptene,
5-methyl-5-tetracyclo[4.4.0.1$^{2,5}$.1$^{7,10}$]-3-dodecyloxycarbonylbicyclo[2.2.1]-2-heptene,
5-tricyclo[5.2.1.0$^{2,6}$]-8-decyloxycarbonylbicyclo[2.2.1]-2-heptene,
5-methyl-5-tricyclo[5.2.1.0$^{2,6}$]-8-decyloxycarbonylbicyclo[2.2.1]-2-heptene,
5-pentacyclo[6.5.1.1$^{3,6}$.0$^{2,7}$.0$^{9,13}$]-4-pentadecyloxycarbonylbicyclo[2.2.1]-2-heptene,
5methyl-5-pentacyclo[6.5.1.1$^{3,6}$.0$^{2,7}$.0$^{9,13}$]-4-pentadecyloxycarbonylbicyclo[2.2.1]-2-heptene,
5-tricyclo[6.2.1.0$^{2,7}$]-9-undecyloxycarbonylbicyclo[2.2.1]-2-heptene,
5-methyl-5-tricyclo[6.2.1.0$^{2,7}$]-9-undecyloxycarbonylbicyclo[2.2.1]-2-heptene,
5-pentacyclo[6.6.1.1$^{3,6}$.0$^{2,7}$.0$^{9,14}$]-4-hexadecyloxycarbonylbicyclo[2.2.1]-2-heptene,
5-methyl-5-pentacyclo[6.6.1.1$^{3,6}$.0$^{2,7}$.0$^{9,14}$]-4-hexadecyloxycarbonylbicyclo[2.2.1]-2-heptene,
5-acetoxybicyclo[2.2.1]-2-heptene,
5-cyanobicyclo[2.2.1]-2-heptene,
6-methyl-5-cyanobicyclo[2.2.1]-2-heptene,
5-methyl-5-cyanobicyclo[2.2.1]-2-heptene,
5,6-dimethyl-5,6-dicyanobicyclo[2.2.1]-2-heptene,
5-carbamoylbicyclo[2.2.1]-2-heptene,
5-N-methylcarbamoylbicyclo[2.2.1]-2-heptene,
5-N,N-diethylcarbamoylbicyclo[2.2.1]-2-heptene,
N,N,N',N'-tetramethyl-5,6-dicarbamoylbicyclo[2.2.1]-2-heptene,
5-chlorobicyclo[2.2.1]-2-heptene,
5-methyl-5-chlorobicyclo[2.2.1]-2-heptene,
5-chloromethyloxycarbonylbicyclo[2.2.1]-2-heptene,
5-dibromopropyloxycarbonylbicyclo[2.2.1]-2-heptene,
5-dichloropropyloxycarbonylbicyclo[2.2.1]-2-heptene,
5-chlorophenyloxycarbonylbicyclo[2.2.1]-2-heptene,
5-monobromophenyloxycarbonylbicyclo[2.2.1]-2-heptene,
5-tribromophenyloxycarbonylbicyclo[2.2.1]-2-heptene,
5,6-dichlorobicyclo[2.2.1]-2-heptene,
5-bromomethylbicyclo[2.2.1]-2-heptene,
5-bromoethylbicyclo[2.2.1]-2-heptene,
5-tribromobenzyloxycarbonylbicyclo[2.2.1]-2-heptene,
bicyclo[2.2.1]-2-heptene-5,6-dicarboxylic anhydride, 5,6-dimethylbicyclo[2.2.1]-2-heptene-5,6-dicarboxylic anhydride,
bicyclo[2.2.1]-2-heptene-5,6-dicarboxylic acid imide,
N-phenyl-5-methylbicyclo[2.2.1]-2-heptene-dicarboxylic acid imide,
5-trichlorosilylbicyclo[2.2.1]-2-heptene,
5-(dimethylmethoxysilyl)bicyclo[2.2.1]-2-heptene,
5-(dimethylacetylsilyl)bicyclo[2.2.1]-2-heptene, and
5-trimethylsilylbicyclo[2.2.1]-2-heptene.

In the compound of the general formula (I), the polar substituent is preferably a carboxylic acid ester group represented by $-(CH_2)_nCOOR^1$ because the resulting polymer has a high glass transition temperature and low hygroscopicity.

The number of the carboxylic acid ester groups is preferably one per one molecule of the tetra cyclododecene derivative because the resulting polymer has low hygroscopicity.

The smaller the n value in the formula $-(CH_2)_nCOOR^1$ for the carboxylic acid ester group, the higher the glass transition temperature of the resulting polymer, and ordinarily n=0 is especially preferable because the monomer synthesis is easier, and the resulting polymer has good properties. In $R^1$, which is a $C_{1-20}$hydrocarbon group, a larger number of carbon atoms is preferred because the resulting polymer has lower hygroscopicity. In view of the balance of hygroscopicity and glass transition temperature of the polymer, a $C_{1-4}$acrylic hydrocarbon group or a $C_{5-20}$(poly)cyclic hydrocarbon group is preferred.

In the compound of the general formula (I), it is preferable that the carbon atom to which the carboxylic acid ester group is bonded has a $C_{1-10}$hydrocarbon group as another substituent because the resulting polymer has low hygroscopicity without lowering the glass transition temperature.

The transparent resin of this invention is composed of a (co)polymer of at least one compound represented by the general formula (I), or a hydrogenation product of said (co)polymer or a hydrogenation product of a copolymer of said compound and other copolymerizable monomer. A good balance of heat resistance, moldability, water absorption, etc. can be obtained by copolymerizing said compound with other copolymerizable monomer. In copolymerization, the proportion of the monomer of the general formula (I) in the copolymer is at least 5 mole %, preferably at least 20 mole %. The copolymerizable monomer used in the copolymerization is a monomer which is ring-opening-polymerizable in the presence of a metathesis catalyst, or a polymer having carbon-to-carbon double bonds in the main chain.

Specific examples of the copolymerizable monomer include polar substituent-containing bicyclo[2.2.1]-2-heptene derivatives represented by the general formula (II):

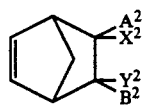

(II)

wherein $A^2$ and $B^2$ are independently hydrogen atoms or hydrocarbon groups of 1–10 carbon atoms, preferably 1–8 carbon atoms, more preferably 1–2 carbon atoms (it is preferable that one of $A^2$ and $B^2$ is H and the other is $CH_3$); $X^2$ and $Y^2$ are independently hydrogen atoms, $C_{1-10}$hydrocarbon groups, halogen atoms, halogen-substituted $C_{1-10}$hydrocarbon groups, $-(CH_2)_nCOOR^1$, $-(CH_2)_nOCOR^1$, $-(CH_2)_nOR^1$, $-(CH_2)_nCN$, $-(CH_2)_nCONR^2R^3$, $-(CH_2)_nCOOZ$, $-(CH_2)_nOCOZ$, $-(CH_2)_2OZ$ or $-(CH_2)_nW$ [$R^1$, $R^2$, $R^3$ and $R^4$ are independently $C_{1-20}$hydrocarbon groups, Z is a halogen-substituted hydrocarbon group, W is $SiR^5_pD_{3-p}$ ($R^5$ is a $C_{1-10}$hydrocarbon group, D is a halogen atom, $-OCOR^5$ or $-OR^5$, p is 0 or an integer of 1–3), n is 0 or an integer of 1–10] with the proviso that at least one of $X^2$ and $Y^2$ is selected from said groups other than the hydrogen atom and the hydrocarbon groups, or $X^2$ and $Y^2$ may form together

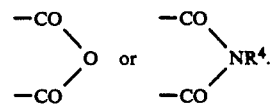

In the general formula (II), the substituents $A^2$ and $B^2$ are preferably hydrocarbon groups in order to obtain lower water absorption. However, when the hydrocarbon group has too many carbon atoms, the heat resistance becomes inferior Further, it is desirable to consider ease of monomer synthesis in the selection of the number of carbon atoms Especially preferably, one of $A^2$ and $B^2$ is a methyl group and the other is a hydrogen atom in view of the balance of the ease of monomer synthesis and low water absorption.

The substituents $X^2$ and $Y^2$ are preferably selected from the group consisting of a hydrogen atom, a $C_{1-10}$hydrocarbon group, $-(CH_2)_nCOOR^1$ and $-(CH_2)_nOCOR^1$. More preferably, one of $X^2$ and $Y^2$ is selected from a hydrogen atom and a $C_{1-10}$hydrocarbon group and the other is selected from $-(CH_2)_nCOOR^1$ and $-(CH_2)_nOCOR^1$. Especially preferably, one is a hydrogen atom and the other is $-COOR^1$ or $-OCOR^1$ ($R^1$ is a $C_{1-4}$alkyl group or a $C_{5-10}$cyclic hydrocarbon group) because the resulting polymer has low water absorption without impairing the heat resistance.

Specific examples of the bicyclo[2.2.1]-2-heptene represented by the general formula (II) include the followings:
5-methoxycarbonylbicyclo[2.2.1]-2-heptene,
5-ethoxycarbonylbicyclo[2.2.1]-2-heptene,
5-n-propoxycarbonylbicyclo[2.2.1]-2-heptene,
5-isopropoxycarbonylbicyclo[2.2.1]-2-heptene,
5-n-butoxycarbonylbicyclo[2.2.1]-2-heptene,
5-isobutoxycarbonylbicyclo[2.2.1]-2-heptene,
5-sec-butoxycarbonylbicyclo[2.2.1]-2-heptene,
5-tert-butoxycarbonylbicyclo[2.2.1]-2-heptene,
5-phenyloxycarbonylbicyclo[2.2.1]-2-heptene,
5-methyl-5-methoxycarbonylbicyclo[2.2.1]-2-heptene,
5-butoxycarbonyl-6-phenylbicyclo[2.2.1]-2-heptene,
5,6-dimethoxycarbonylbicyclo[2.2.1]-2-heptene,
5-cyclohexyloxycarbonylbicyclo[2.2.1]-2-heptene,
5-(4'-tert-butylcyclohexyloxy)carbonylbicyclo[2.2.1]-2-heptene,
5-methyl-5-cyclohexyloxycarbonylbicyclo[2.2.1]-2-heptene,
5-methyl-5-(4'-tert-butylcyclohexyloxy)carbonylbicyclo[2.2.1]-2-heptene,
5-menthyloxycarbonylbicyclo[2.2.1]-2-heptene,
5-methyl-5-menthyloxycarbonylbicyclo[2.2.1]-2-heptene,
5-bornyloxycarbonylbicyclo[2.2.1]-2-heptene,
5-methyl-5bornyloxycarbonylbicyclo[2.2.1]-2-heptene,
5-isobornyloxycarbonylbicyclo[2.2.1]-2-heptene, 5-adamantyloxycarbonylbicyclo[2.2.1]-2-heptene,
5-methyl-5-adamantyloxycarbonylbicyclo[2.2.1]-2-heptene,
5-bicyclo[2.2.1]-2-heptyloxycarbonylbicyclo[2.2.1]-2-heptene,
5-methyl-5-bicyclo[2.2.1]-2-heptyloxycarbonylbicyclo[2.2.1]-2-heptene,
5-tetracyclo[4.4.0.1$^{2,5}$.1$^{7,10}$]-3-dodecyloxycarbonylbicyclo[2.2.1]-2-heptene,
5-methyl-5-tetracyclo[4.4.0.1$^{2,5}$.1$^{7,10}$]-3-dodecyloxycarbonylbicyclo[2.2.1]-2-heptene,
5-tricyclo[5.2.1.0$^{2,6}$]-8-decyloxycarbonylbicyclo[2.2.1]-2-heptene,
5-methyl-5-tricyclo[5.2.1.0$^{2,6}$]-8-decyloxycarbonylbicyclo[2.2.1]-2-heptene,
5-pentacyclo[6.5.1.1$^{3,6}$.0$^{2,7}$.0$^{9,13}$]-4-pentadecyloxycarbonylbicyclo[2.2.1]-2-heptene,
5-methyl-5-pentacyclo[6.5.1.1$^{3,6}$.0$^{2,7}$.0$^{9,13}$]-4-pentadecyloxycarbonylbicyclo[2.2.1]-2-heptene,
5-tricyclo[6.2.1.0$^{2,7}$]-9-undecyloxycarbonylbicyclo[2.2.1]-2-heptene,
5-methyl-5-tricyclo[6.2.1.0$^{2,7}$]-9-undecyloxycarbonylbicyclo[2.2.1]-2-heptene,
5-pentacyclo[6.6.1.1$^{3,6}$.0$^{2,7}$.0$^{9,14}$]-4-hexadecyloxycarbonylbicyclo[2.2.1]-2-heptene,
5-methyl-5-pentacyclo[6.6.1.1$^{3,6}$.0$^{2,7}$.0$^{9,14}$]-4-hexadecyloxycarbonylbicyclo[2.2.1]-2-heptene,
5-acetoxybicyclo[2.2.1]-2-heptene,
5-cyanobicyclo[2.2.1]-2-heptene,
6-methyl-5-cyanobicyclo[2.2.1]-2-heptene,
5-methyl-5-cyanobicyclo[2.2.1]-2-heptene,
5,6-dimethyl-5,6-dicyanobicyclo[2.2.1]-2-heptene,
5-carbamoylbicyclo[2.2.1]-2-heptene,
5-N-methylcarbamoylbicyclo[2.2.1]-2-heptene,
5-N,N-diethylcarbamoylbicyclo[2.2.1]-2-heptene,
N,N,N',N'-tetramethyl-5,6-dicarbamoylbicyclo[2.2.1]-2-heptene,
5-chlorobicyclo[2.2.1]-2-heptene,
5-methyl-5-chlorobicyclo[2.2.1]-2-heptene,
5-chloromethyloxycarbonylbicyclo[2 2.1]-2-heptene,
5-dibromopropyloxycarbonylbicyclo[2.2.1]-2-heptene,
5-dichloropropyloxycarbonylbicyclo[2.2.1]-2-heptene,
5-chlorophenyloxycarbonylbicyclo[2.2.1]-2-heptene,
5-monobromophenyloxycarbonylbicyclo[2.2.1]-2-heptene,
5-tribromophenyloxycarbonylbicyclo[2.2.1]-2-heptene,
5,6-dichlorobicyclo[2.2.1]-2-heptene,
5-bromomethylbicyclo[2.2.1]-2-heptene,
5-bromoethylbicyclo[2.2.1]-2-heptene,
5-tribromobenzyloxycarbonylbicyclo[2.2.1]-2-heptene,
bicyclo[2.2.1]-2-heptene-5,6-dicarboxylic anhydride,
5,6-dimethylbicyclo[2.2.1]-2-heptene-5,6-dicarboxylic anhydride,
bicyclo[2.2.1]-2-heptene-5,6-dicarboxylic acid imide,
N-phenyl-5-methylbicyclo[2.2.1]-2-heptenedicarboxylic acid imide,
5-trichlorosilylbicyclo[2.2.1]-2-heptene,
5-(dimethylmethoxysilyl)bicyclo[2.2.1]-2-heptene,
5-(dimethylacetylsilyl)bicyclo[2.2.1]-2-heptene, and
5-trimethylsilylbicyclo[2.2.1]-2-heptene.

The proportions of the compound represented by the general formula (I) and the compound represented by the general formula (II) in the copolymer can vary depending upon the glass transition temperatures and water absorptions of the respective homopolymers, but are preferably (I)/(II)=95/5–5/95 (by weight), more preferably (I)/(II)=90/10–10/90 (by weight).

The tetracyclododecene derivative of the general formula (I) where m=1 can be ring-opening-copolymerized with a cyclic olefin compound to form a copolymer. Specific examples of such a cyclic olefin include cycloolefins such as cyclopentene, cyclooctene, 1,5-cyclooctadiene, 1,5,9-cyclododecatriene and the like; and polycycloalkenes such as bicyclo[2.2.1]-2-heptene, tricyclo[5.2.1.0$^{2,6}$]-8-decene, tricyclo[5.2.1.0$^{2,6}$]-3-decene, tricyclo[6.2.1.0$^{1,8}$]-9-undecene, tricyclo[6.2.1.0$^{1,8}$]-4-undecene, tetracyclo[4.4.0.1$^{2,5}$.1$^{7,10}$]-3-dodecene, pentacyclo[6.5.1.1$^{3,6}$.0$^{2,7}$.0$^{9,13}$]-4-pentadecene, pentacyclo[6.6.1.1$^{3,6}$.0$^{2,7}$.0$^{9,14}$]-4-hexadecene, pentacyclo[6.5.1.1$^{3,6}$.0$^{2,7}$.0$^{9,13}$]-11-pentadecene and the like.

The above polycycloalkenes are useful for obtaining a copolymer having low hygroscopicity and a controlled glass transition temperature. Hence, when the homopolymer of the tetradodecene derivative or a copolymer of the tetradodecene derivative with a bicycloheptene has a high glass transition temperature which is close to or above the thermal decomposition temperature, the tetracyclododecene derivative can be copolymerized with a cycloolefin to lower the glass transition temperature of the copolymer to a temperature at which molding can be easily effected actually.

When the obtained polymer has a glass transition temperature as low as not more than 100° C, it is possible to reduce the hygroscopicity and elevate the glass transition temperature by copolymerizing the tetracyclododecene derivative with a polycycloalkene.

The compound represented by the general formula (I) can also be copolymerized with an unsaturated hydrocarbon type rubbery polymer having carbon-to-carbon double bonds in the main chain in order to obtain a copolymer of improved strength, particularly improved impact resistance. In this case, it is preferable that the difference in refractive index between the rubbery polymer and the polymer obtained from the compound of the general formula (I) be as small as possible in order for the resulting copolymer to have transparency. The rubbery polymer includes a polybutadiene, a polyisoprene, an ethylene-propylene-non-conjugated diene copolymer rubber, a polynorbornene, a polypentenamer, etc. In order for the above two polymers to have substantially the same refractive index, there are preferably used, as the rubbery polymer, a styrene-butadiene copolymer, a styrene-butadiene block copolymer and its hydrogenation product, a styrene-isoprene block copolymer, etc. In order for the polymer of the compound of the general formula (I) to have a refractive index substantially identical with that of the rubbery polymer, it is possible to also copolymerize it with a compound of the general formula (II).

The thus produced (co)polymer preferably has a saturated water absorption of 1.8% or less and a glass transition temperature of at least 100° C. The saturated water absorption is more preferably 1.2% or less, most preferably 0.8% or less. The glass transition temperature is more preferably at least 120° C.

The metathesis catalyst used in producing a ring opening (co)polymer ordinarily consists of a combination of:

(a) at least one member selected from the group consisting of compounds of W, Mo and Re, and
(b) at least one member selected from the group consisting of compounds of elements of the Ia, IIa, IIb, IIIa, IVa and IVb Groups of the Deming Periodic Table, having at least one element-to-carbon bond or at least one element-to-hydrogen bond.

The metathesis catalyst may further contain an additive for enhancing the catalyst activity.

W, Mo and Re compounds suitable as the component (a) are halides, oxyhalides, alkoxyhalides, alkoxides, carboxylates, (oxy)acetylacetonates, carbonyl complexes, acetonitrile complexes and hydride complexes of W, Mo and Re, their derivatives, and their combinations. Of these, preferred are compounds of W and Mo, and particularly preferred are halides, oxyhalides and alkoxyhalides of W and Mo from the standpoint of their polymerization activity and practical use. Each of the W, Mo and Re compounds may be a mixture of two or more compounds which can form the above W, Mo or Re compound upon reaction with each other Also, the W, Mo or Re compound may be complexed with an appropriate complexing agent such as $P(C_6H_5)_5$, $C_5H_5N$ or the like.

Specific examples of the component (a) are $WCl_6$, $WCl_5$, $WCl_4$, $WBr_6$, $WI_6$, $MoCl_5$, $MoCl_4$, $MoCl_3$, $ReCl_3$, $WOCl_4$, $MoOCl_3$, $ReOCl_3$, $ReOBr_3$, $W(OC_6H_5)_6$, $WCl_2(OC_6H_5)_4$, $Mo(OC_2H_5)_2Cl_3$, $Mo(OC_2H_5)_5$, $MoO_2(acac)_2$, $W(OCOR)_5$, $W(CO)_6$, $Mo(CO)_6$, $Re_2(CO)_{10}$, $ReOBr_3 \cdot P(C_6H_5)_3$, $WCl_5 \cdot P(C_6H_5)_3$, $WCl_6 \cdot C_5H_5N$, $W(CO)_5 \cdot P(C_6H_5)_3$, $W(CO)_3 \cdot (CH_3CN)_3$. Of these, $MoCl_5$, $Mo(OC_2H_5)_2Cl_3$, $WCl_6$ and $W(OC_2H_5)_2Cl_3$ are especially preferred.

Compounds suitable as the component (b) are compounds of elements of the Ia, IIa, IIb, IIIa, IVa and IVb Groups of the Deming Periodic Table, having at least one element-to-carbon bond or at least one element-to-hydrogen bond, or hydrides of the elements Specific examples of the component (b) include $n\text{-}C_4H_5Li$, $n\text{-}C_5H_{11}Na$, $C_5H_5Na$, $CH_3MgI$, $C_3H_5MgBr$, $CH_3MgBr$, $n\text{-}C_3H_7MgCl$, $(C_6H_5)_3Al$, $t\text{-}C_4H_9MgCl$, $CH_2\!=\!CHCH_2MgCl$, $(C_2H_5)_2Zn$, $(C_2H_5)_2Cd$, $CaZn(C_2H_5)_4$, $(CH_3)_3B$, $(C_2H_5)_3B$, $(n\text{-}C_4H_9)_3B$, $(CH_3)_3Al$, $(CH_3)_2AlCl$, $(CH_3)_3Al_2Cl_3$, $CH_3AlCl_2$, $(C_2H_5)_3Al$, $LiAl\,Al(C_2H_5)_2$, $(C_2H_5)_3Al\text{-}O(C_2H_5)_2$, $(C_2H_5)_2AlCl$, $C_2H_5AlCl_2$, $(C_2H_5)_2AlH$, $(iso\text{-}C_4H_9)_2AlH$, $(C_2H_5)_2AlOC_2H_5$, $(iso\text{-}C_4H_9)_3Al$, $(C_2H_5)_3Al_2Cl_3$, $(CH_3)_4Ga$, $(CH_3)_4Sn$, $(n\text{-}C_4H_9)_4Sn$, $(C_2H_5)_3SiH$, $(n\text{-}C_6H_{13})_3Al$, $(n\text{-}C_4H_{17})_3Al$, $LiH$, $NaH$, $B_2H_6$, $NaBH_4$, $AlH_3$, $LiAlH_4$, and $TiH_4$. A mixture of two or more compounds which can form one of the above compounds upon reaction with each other may be used as an alternative.

Particularly preferred are $(CH_3)_3Al$, $(CH_3)_2AlCl$, $(CH_3)_3Al_2Cl_3$, $CH_3AlCl_2$, $(C_2H_5)_3Al$, $(C_2H_5)_2AlCl$, $(C_2H_5)_{1.5}AlCl_{1.5}$, $C_2H_5AlCl_2$, $(C_2H_5)_2AlH$, $(C_2H_5)_2AlOC_2H_5$, $(C_2H_5)_2AlCN$, $(C_3H_7)_3Al$, $(iso\text{-}C_4H_9)_3Al$, $(iso\text{-}C_4H_9)_2AlH$, $(C_6H_{13})_3Al$, $(C_8H_{17})_3Al$ and $(C_6H_5)_5Al$.

The proportions of the component (a) and the component (b) are (a):(b)=1:1–1:20, preferably (a):(b)=1:2–1:10 in terms of metallic atom ratio.

The catalyst prepared from the two components (a) and (b) ordinarily exhibits a high activity in the polymerization reaction for obtaining a transparent resin. If necessary, the catalyst can further contain a component (c) (an activating agent) as mentioned below to obtain a higher activity.

Various compounds can be used as the component (c). Especially preferable compounds include the followings:

(1) simple boron; non-organometal compounds of boron such as $BF_3$, $BCl_3$, $B(O\text{-}n\text{-}C_4H_9)_3$, $(C_2H_5O_3)_2$, $BF$, $B_2O_3$, $H_3BO_3$ and the like; and non-organometal compounds of Si such as $Si(OC_2H_5)_4$ and the like, (2) alcohols, hydroperoxides and peroxides, (3) water, (4) oxygen, (5) carbonyl compounds such as aldehyde, ketone and the like; and their polymers, (6) cyclic ethers such as ethylene oxide, epichlorohydrin, oxetane and the like, (7) amides such as N,N-diethylformamide, N,N-dimethylacetamide and the like; amines such as aniline, morpholine, piperidine and the like; and azo compounds such as azobenzene and the like, (8) N-nitroso compounds such as N-nitrosodimethylamine, N-nitrosodiphenylamine and the like; and (9) compounds containing a S-Cl or N-Cl group such as trichloromelamine, N-chlorosuccinoimide, phenylsulphenyl chloride and the like.

When the component (c) is used, the proportions of the components (a) and (b) greatly vary depending upon the type of the component (c) and cannot be determined by a specific rule. The component (c) is used in many cases at a (c)/(a) molar ratio of 0.005–10, preferably 0.05–1.0.

The molecular weight of the ring opening (co)polymer obtained can be controlled by changing reaction conditions such as type and concentration of catalyst, polymerization temperature, type and concentration of solvent and concentration of monomer. Preferably, the molecular weight is controlled by adding to the reaction system an appropriate amount of a compound having at least one carbon-to-carbon double bond or at least one carbon-to-carbon triple bond within the molecule, such as α-olefin, α, ω-diolefin, acetylene or the like, or an appropriate amount of a polar allyl compound such as allyl chloride, allyl acetate, trimethylallyloxysilane or the like.

The molecular weight of the ring opening (co)polymer is preferably 10,000–3,000,000 in terms of polystyrene-reduced weight-average molecular weight. It is more preferably 30,000–1,000,000 for obtaining a high glass transition temperature and good moldability and especially preferably 50,000–900,000 for obtaining a proper balance of moldability and strength.

The solvent used in the polymerization reaction includes, for example, alkanes such as pentane, hexane, heptane, octane, nonane, decane and the like, cycloalkanes such as cyclohexane, cycloheptane, cyclooctane, decalin, norbornane and the like; aromatic compounds such as benzene, toluene, xylene, ethylbenzene, cumene and the like; halogenated alkanes and halogenated aryl compounds such as methylene chloride, bromohexane, dichloroethane, hexamethylene dibromide, chlorobenzene and the like; saturated carboxylic acid esters such as ethyl acetate, methyl propionate and the like; and ethers.

The hydrogenation reaction of the (co)polymer obtained by the metathesis ring opening polymerization can be effected according to a conventional method. The catalyst used in this hydrogenation reaction may be a catalyst which is used in the conventional hydrogenation reaction of olefinic compound.

The heterogeneous catalyst includes, for example, solid catalysts in which a catalyst substance such as palladium, platinum, nickel, rhodium, ruthenium or the like is supported on a carrier such as carbon, silica, alumina, titania or the like.

The homogeneous catalyst includes, for example, nickel naphthenate/triethylaluminum; nickel acetylacetonate/ triethylaluminum; cobalt octenoate/n-butyllithium; titanocene dichloride/diethylaluminum monochloride; and rhodium catalysts such as rhodium acetate, chlorotris(triphenylphosphine)rhodium and the like.

The hydrogenation reaction can be effected at 0°-180° C., preferably 20°-150° C. in a hydrogen gas atmosphere at atmospheric pressure-300 atm., preferably 3-150 atm.

The hydrogenated (co)polymer has excellent heat stability and accordingly its characteristics are not deteriorated even when it is heated during molding or during use as a product.

The hydrogenation degree is ordinarily at least 50%, preferably at least 70%, more preferably at least 80%, especially preferably at least 99%. When the hydrogenation degree is less than 50%, the effect of heat stability improvement is low.

In the step of hydrogenation of the (co)polymer obtained by subjecting at least one monomer represented by the general formula (I) or this monomer and other copolymerizable monomer to ring opening polymerization, it is preferable to effect the hydrogenation in substantially the same organic solvent as used in the ring opening polymerization step.

As such an organic solvent, there is used at least one compound selected from saturated carboxylic acid esters, saturated alicyclic hydrocarbon compounds and ether compounds. The solvent is preferably at least one compound selected from the alkyl esters of saturated carboxylic acids wherein the sum total of the carbon atoms of the alkyl group due to the saturated carboxylic acid and those of the alkyl group due to the alcohol are 5-10, $C_{5-10}$ saturated alicyclic hydrocarbon compounds, $C_{4-10}$ acyclic monoether compounds, $C_{4-10}$ acyclic diether compounds and $C_{4-10}$ compounds having an ether bond and a carboxylic acid ester group in the molecule.

The saturated carboxylic acid esters used as an organic solvent in this invention are represented by the general formula, $R^a$—$COOR^b$ where $R^a$ is a hydrogen atom or a $C_{1-2}$ alkyl group and $R^b$ is an alkyl group having 1-10 carbon atoms, preferably 1-6 carbon atoms, more preferably 1-4 carbon atoms.

Specific examples of the saturated carboxylic acid esters include, for example, formic acid esters such as methyl formate, ethyl formate, n-propyl formate, isopropyl formate, n-butyl formate, 1-methylpropyl formate, 2-methylpropyl formate, tert-butyl formate, n-pentyl formate, 1-methylbutyl formate, 2-methylbutyl formate, 3-methylbutyl formate, 1,1-dimethylpropyl formate, 1,2-dimethylpropyl formate, 2,2-dimethylpropyl formate, n-hexyl formate, 1-methylpentyl formate, 2-methylpentyl formate, 3-methylpentyl formate, 4-methylpentyl formate, 1,1-dimethylbutyl formate, 2,2-dimethylbutyl formate, 3,3-dimethylbutyl formate, 1,2-dimethylbutyl formate, 1,3-dimethylbutyl formate, 2,3-dimethylbutyl formate, n-heptyl formate, cyclohexyl formate, n-octyl formate, 2-ethylhexyl formate and the like; acetic acid esters such as methyl acetate, ethyl acetate, n-propyl acetate, isopropyl acetate, n-butyl acetate, 1-methylpropyl acetate, 2-methylpropyl acetate, tert-butyl acetate, n-pentyl acetate, 1-methylbutyl acetate, 2-methylbutyl acetate, 3-methylbutyl acetate, 1,1-dimethylpropyl acetate, 1,2-dimethylpropyl acetate, 2,2-dimethylpropyl acetate, n-hexyl acetate, 1-methylpentyl acetate, 2-methylpentyl acetate, 3-methylpentyl acetate, 4-methylpentyl acetate, 1,1-dimethylbutyl acetate, 2,2-dimethylbutyl acetate, 3,3-dimethylbutyl acetate, 1,2-dimethylbutyl acetate, 1,3-dimethylbutyl acetate, 2,3-dimethylbutyl acetate, cyclohexyl acetate, n-heptyl acetate, n-octyl acetate, 2-ethylhexyl acetate and the like; and propionic acid esters such as ethyl propionate, methyl propionate, n-propyl propionate, isopropyl propionate, n-butyl propionate, 1-methylpropyl propionate, 2-methylpropyl propionate, tert-butyl propionate, n-pentyl propionate, 1-methylbutyl propionate, 2-methylbutyl propionate, 3-methylbutyl propionate, 1,1-dimethylpropyl propionate, 1,2-dimethylpropyl propionate, 2,2-dimethylpropyl propionate, n-hexyl propionate, cyclohexyl propionate, n-heptyl propionate, n-octyl propionate, 2-ethylhexyl propionate and the like.

The saturated alicyclic hydrocarbon compounds used as an organic solvent in this invention have a cyclic skeletal structure of 10 or less carbon atoms, preferably 5-8 carbon atoms and may be substituted with an alkyl group. Specific examples of the saturated alicyclic hydrocarbon compounds include, for example, cyclopentane, methylcyclopentane, cyclohexane, methylcyclohexane, dimethylcyclohexane, ethylcyclohexane, cycloheptane, decalin and the like.

The ether compounds are preferably $C_{4-10}$ acyclic monoether compounds and acyclic diether compounds. Specific examples of the ether compounds include di-n-propyl ether, di-isopropyl ether, di-n-butyl ether, di-isobutyl ether, di-tert-butyl ether, dipentyl ether, 1,2-dimethoxyethane, 1,2-diethoxyethane, 1,2-methoxyethoxyethane, 1,2-dipropoxyethane, 1,2-dibutoxyethane, 2-methoxyethyl acetate, 2-ethoxyethyl acetate, 2-propoxyethyl acetate, 2-butoxyethyl acetate, 3-methoxypropyl acetate and 3-ethoxypropyl acetate.

Of these, preferred are n-butyl acetate, cyclohexane, dibutyl ether, 1,2-dimethoxyethane, 1,2-diethoxyethane, methoxyethyl acetate and ethoxyethyl acetate, and n-butyl acetate is the most preferable, from the standpoints of solvency over a wide temperature range and ease of recovery.

The above saturated carboxylic acid esters, saturated alicyclic hydrocarbon compounds and ether compounds do not deteriorate the activities of the metathesis polymerization catalyst and hydrogenation catalyst used and moreover have a high solvency for both the ring opening (co)polymer produced by a metathesis ring opening reaction and the hydrogenated product of the (co)polymer Therefore, the molecular weight control of the desired hydrogenated (co)polymer is easy; a hydrogenated (co)polymer can be produced in a high yield; and the hydrogenation reaction can give a high hydrogenation degree Further, since said solvents themselves do not undergo hydrogenation, reduction with hydrogen and hydrocracking, there is no unnecessary consumption of hydrogen and the solvents can be used repeatedly, which is advantageous economically.

In the process of this invention, one common specific organic solvent is used in both the ring opening (co)polymerization step and the hydrogenation step. Therefore, these two steps can be effected continuously without separating the ring opening (co)polymer after the ring opening polymerization reaction. Further, in the present process, the molecular weight control of the polymer produced is easy and both the catalyst and the organic solvent can be reused. Accordingly, a desired hydrogenation (co)polymer can be produced very easily at a high efficiency.

Catalyst removal is effected preferably by contacting the polymer solution with an aqueous solution of an organic acid This method enables the efficient removal of not only the metals of a ring opening polymerization catalyst consisting of a main catalyst represented by a tungsten compound and an organometal compound having a reducing power, a representative of which is an organoaluminum compound, but also the halogen atoms bonded to said metal atoms, and can produce a (co)polymer containing very small amounts of residual metals and halogens (these residual metals and halogens cause the deterioration and coloring of a polymer containing them).

The organic acid compound includes, for example, aliphatic monocarboxylic acids such as formic acid, acetic acid, monochloroacetic acid, dichloroacetic acid, trichloroacetic acid, propionic acid, acrylic acid, itaconic acid and the like; aliphatic dicarboxylic acids such as oxalic acid, malonic acid, adipic acid, azelaic acid, maleic acid, fumaric acid and the like; aliphatic polycarboxylic acids such as propanetricarboxylic acid, butanetetracarboxylic acid and the like; oxy acids such as citric acid, tartaric acid and the like; alicyclic monocarboxylic acids such as cyclopentanecarboxylic acid, cyclopentanedicarboxylic acid, cyclopentanetricarboxylic acid, cyclopentanetetracarboxylic acid, cyclohexanecarboxylic acid, cyclohexanedicarboxylic acid, cyclohexanetricarboxylic acid, cyclohexanetetacarboxylic acid, himic acid and the like; aromatic monocarboxylic acids such as dicarboxylic acids, polycarboxylic acids, benzoic acid, phthalic acid, isophthalic acid, terephthalic acid, trimellitic acid, pyromellitic acid and the like; and phenols such as dicarboxylic acids, polycarboxylic acids, phenol, cresol, xylenol and the like. Of these, organic acids having 1 to 6 carbon atoms are preferred because they are less soluble in the formed polymer and hence hardly remain therein. Among these organic acids, acetic acid and oxalic acid are especially preferred because they are excellent in removal efficiency of catalyst metals and also removal efficiency of halogens which are a constructive element for catalyst (chlorine in particular) and do not remain in the polymer after the decatalyst treatment and can be separated from the polymer.

The organic acid compound is usually used in the form of a 0.05-15% by weight aqueous solution, preferably a 0.1-10% by weight aqueous solution, especially preferably a 0.5-8% by weight aqueous solution.

When the concentration of the organic acid compound in the aqueous solution is less than 0.05%, the removal efficiency of the residual catalyst metals and halogens is low and the recovered polymer contains large amounts of them which cause coloration of the polymer. When the concentration of the organic acid compound is more than 15%, the effect of the organic acid compound is already at a saturation point, and even the polymer recovered after the neutralization of the organic acid compound to remove the same contains a certain amount of the organic acid compound. This organic acid compound causes the coloring of the polymer under the high temperature conditions used during the molding of the polymer, and the organic acid bleeds to the surface of the resulting molded article to impair the appearance of the article. When the organic acid concentration is in a range of 0.05-15%, it has a stable residual catalyst removal effect, and the resulting polymer is hardly colored owing to residual catalyst metal and contains substantially no organic acid.

In general, the proportion between the ring opening polymer solution and the aqueous organic acid solution is preferably 5-500 parts by weight, more preferably 10-300 parts by weight, especially preferably 20-200 parts by weight of the aqueous organic acid solution per 100 parts by weight of the polymer solution having a polymer concentration of 1-30% by weight.

The method of contacting the polymer solution with the aqueous organic acid solution can usually be carried out using a conventional mechanical stirrer, a static mixer, a line mixer, a homomixer, etc. Needless to say, the use of a stirrer having a higher stirring efficiency is superior in efficiency of removal of the residual metals in the polymer solution. The contact time and temperature may be varied depending upon the efficiency of stirring, and the contact time is ordinarily 1 minute to 3 hours. The lower limit of the contact temperature is the freezing point of water and the upper limit is the boiling point of the solvent of the polymer solution or the boiling point of water (lower point of the two). The preferable contact temperature range is 5°-60° C.

After the polymer solution has been contacted with the aqueous organic acid solution to remove, by extraction, the catalyst metals from the polymer solution, the organic layer is, if necessary, neutralized, washed with water and subjected to a conventional polymer recovery step to isolate a polymer freed of the polymerization catalyst.

In recovering a ring opening (co)polymer of at least one monomer represented by the general formula (I), a ring opening copolymer of said monomer and other copolymerizable monomer, or a hydrogenation product of either of them from its solution, it is preferable that a solution of the (co)polymer to be recovered be mixed with a mixed solvent consisting of 5-50 parts by volume of a good solvent (good to the (co)polymer) and 95-50 parts by volume of a poor solvent (the two solvents must be miscible with each other) so that the volume ratio of the (co)polymer solution to the mixed solvent becomes 1:90-30:70, whereby the (co)polymer be coagulated and then recovered.

The (co)polymer solution to which the process of this invention is applied is a solution containing a (co)polymer produced from the above-mentioned cyclic monomer of the general formula (I). Specific examples of the (co)polymer solution include (1) a (co)polymer solution obtained after the completion of the ring opening (co)polymerization reaction of said monomer, (2) a hydrogenated (co)polymer solution obtained by subjecting the (co)polymer solution (1) to hydrogenation reaction, (3) a solution obtained by subjecting the (co)polymer solution (1) or the hydrogenated (co)polymer solution (2) to a decatalyst treatment and (4) a (co)polymer solution obtained by dissolving in an appropriate solvent a (co)polymer recovered by, for example, subjecting the solution (3) to ordinary recovery method such as steam stripping or coagulation from poor solvent.

In the process of this invention, it is preferable that a (co)polymer solution as mentioned above and a mixed solvent consisting of specific proportions of a good solvent for the objective (co)polymer and a poor solvent for the objective (co)polymer be mixed at a specific ratio, whereby the objective (co)polymer be coagulated, separated and recovered.

In this invention, a good solvent for the objective (co)polymer refers to such a solvent that the maximum solubility of the (co)polymer in the solvent at a temperature as employed in the recovery treatment is at least 5% by weight, and a poor solvent refers to such a solvent that the maximum solubility of the (co)polymer in the solvent at the same temperature is less than 5% by weight.

In the present process, the good solvent includes, for example, aromatic hydrocarbon compounds such as benzene, toluene, xylene, ethylbenzene, cumene, butylbenzene, tetralin, p-cymene, cyclohexylbenzene, diethylbenzene and the like; alicyclic hydrocarbon compounds such as cyclopentane, methylcyclopentane, cyclohexane, methylcyclohexane and the like; halogenated hydrocarbon compounds such as methylene chloride, chloroform, carbon tetrachloride, 1,1-dichloroethane, 1,2-dichloroethane, 1,1,1-trichloroethane, 1,1,2-trichloroethane, 1,1,2,2-tetrachloethane, 1,1,2,2-tetrachloroethane, pentachloroethane, hexachloroethane, 1,2-dichloropropane, 1,2,3-trichloropropane, bromoform, 1,2-bromoethane, 1,1,2,2-tetrabromoethane, chlorobenzene, dichlorobenzene, bromobenzene, dibromobenzene and the like; esters of aliphatic carboxylic acids of 2 or more carbon atoms with alcohols of 3 or more carbon atoms such as butyl acetate, propyl acetate, pentyl acetate, hexyl acetate, cyclohexyl acetate, methyl propionate, ethyl propionate, butyl propionate, pentyl propionate, hexyl propionate and the like; cyclic ether compounds such as tetrahydrofuran, dioxane, tetrahydropyran, cineole and the like; and their mixtures. Of these, the aromatic hydrocarbon compounds, the cyclic ether compounds and the carboxylic acid esters are preferably used as a good solvent.

The poor solvent includes, for example, aliphatic hydrocarbon compounds such as hexane, butane, octane, nonane, decane, undecane, dodecane and the like; esters of a lower carboxylic acid of 3 or less carbon atoms with an alcohol of 2 or less carbon atoms, such as methyl formate, ethyl formate, methyl acetate, ethyl acetate and the like; lower alkyl ketones such as acetone, methyl ethyl ketone and the like; lower alcohols such as methanol, ethanol, propanol, butanol/pentanol, hexanol and the like; and their mixtures Of these, the lower alkyl ketones and the lower alcohols are preferably used as a poor solvent.

With respect to the mixed solvent used in this invention, specific examples of the preferable combination of a good solvent and a poor solvent are combinations of a good solvent selected from aromatic hydrocarbon compounds (e.g. toluene, xylene and the like), cyclic ether compounds (e.g. tetrahydrofuran, dioxane and the like) and carboxylic acid esters (e.g. n-butyl acetate, isobutyl acetate and the like) and a poor solvent selected from the lower alcohols, for example, methanol, ethanol, propanol and the like.

Of these combinations, especially preferable are combinations of toluene, xylene, tetrahydrofuran or n-butyl acetate as a good solvent with methanol as a poor solvent because such mixed solvents enable the recovery of a (co)polymer containing small amounts of low-molecular weight polymers (the low-molecular weight polymers refer to polymers having a polystyrene-reduced molecular weight of, for example, 3000 or less) and are easy to recover, thus providing an economical advantage. In this invention, the solvent used in the (co)polymer solution can be the same as the good solvent. This matter is preferable because the solvent recovery and refining step can be simple.

The volume ratio of the good solvent to the poor solvent is preferably 5:95-50:50, especially preferably 20:80-40:60. When the two solvents are in these ranges, (co)polymer recovery is easy and the recovery (%) is high. The recovered (co)polymer contains small amounts of the unreacted monomer(s) and low-molecular weight polymers.

In the present process, the volume ratio of the (co)polymer solution to the mixed solvent is preferably 1:99-30:70, especially preferably 5:95-15:85.

By mixing the (co)polymer solution with the mixed solvent, a (co)polymer is coagulated. This (co)polymer is separated from the liquid phase and recovered according to a conventional means such as filtration, centrifugation or the like. At the time of this separation, the (co)polymer may be ground by use of an apparatus such as a crusher or the like.

The thus recovered (co)polymer can be subjected to post-treatment if necessary. For example, by contacting the (co)polymer with a poor solvent, the unreacted monomers and low-molecular weight polymers or their hydrogenation products remaining in the (co)polymer can be extracted and removed. As such a poor solvent, the poor solvents mentioned as one component of the mixed solvent can be used though lower alcohols are preferable and methyl alcohol is the most preferable mainly because it causes no coagulation of (co)polymer during the extraction step. The contact with the poor solvent is effected at a temperature ranging from room temperature to 150° C., preferably from room temperature to 120° C., for a period of ordinarily 5 minutes to 50 hours, preferably 20 minutes to 30 hours, more preferably 30 minutes to 15 hours.

In carrying out the process of this invention, it is possible to add to the mixed system of the mixed solvent and the (co)polymer solution, additives such as catalyst-removing agent, antioxidant, ultraviolet absorber and the like to obtain a (co)polymer having effects of such additives.

The transparent resin material of this invention can be stabilized by incorporating thereinto a known antioxidant such as 2,6-di-tert-butyl-4-methylphenol, 2,2'-dioxy-3,3'-di-tert-butyl-5,5'-dimethyldiphenylmethane, phenyl-$\beta$-naphthylamine or the like, or an ultraviolet absorber such as 2,4-dihydroxybenzophenone, 2-hydroxy-4-methoxybenzophenone, 2'-hydroxy-4-methoxy-2'-carboxybenzophenone or the like. It may further contain additives which are conventionally used in resin processing, such as lubricant and the like for improving its processability.

The transparent resin material of this invention can be made into optical products, etc. by various known molding methods such as injection molding, compression molding, extrusion molding and the like.

The transparent resin material of this invention can be improved in heat resistance, optical properties, chemical resistance, wear resistance, resistance to moisture permeability, etc. by hard-coating on the surface thereof an inorganic compound, an organic silicon compound (e.g. silane coupling agent or the like), an acrylic resin, a vinyl resin, a melamine resin, an epoxy resin, a fluoro resin, a silicone resin or the like according to a method such as thermal curing, ultraviolet curing, vacuum deposition, sputtering, ion plating or the like.

The transparent resin material of this invention can be used in admixture with various polymers. When it is mixed with a rubbery polymer, an impact-resistant polymer composition can be obtained. This rubbery polymer may be ordinary rubbery polymers requiring vulcanization prior to use, as well as thermoplastic elstomers which do not require vulcanization.

The rubbery polymers include, for example, α-olefins such as polyethylene, polypropylene and the like; ethylene-α-olefin copolymers such as ethylene-propylene random or block copolymer, ethylene-butylene random or block copolymer, and the like; ethylene-unsaturated carboxylic acid ester copolymers such as ethylene-methyl methacrylate copolymer, ethylene-butyl acrylate copolymer, and the like; copolymers of ethylene and an ester of vinyl alcohol with a fatty acid, such as ethylene-vinyl acetate copolymer and the like; polymers of an alkyl acrylate such as ethyl acrylate, butyl acrylate, hexyl acrylate, 2-ethylhexyl acrylate, lauryl acrylate or the like; ethylene-propylene-non-conjugated diene terpolymers such as ethylene-propylene-ethylidenenorbornene copolymer, ethylene-propylene-hexadiene copolymer and the like; diene rubbers such as polybutadiene, styrene-butadiene random or block copolymer, acrylonitrile-butadiene copolymer, butadiene-isoprene copolymer and the like; butylene-isoprene copolymer; and hydrogenation products of a block copolymer of an aromatic hydrocarbon compound (e.g. styrene or the like) with an aliphatic diene hydrocarbon compound (e.g. butadiene, isoprene or the like). These rubbery polymers can be used alone or in combination of two or more.

The thermoplastic elastomers include, for example, aromatic vinyl-conjugated diene block copolymers such as styrene-butadiene block copolymer, hydrogenated styrene-butadiene block copolymer, styrene-isoprene block copolymer, hydrogenated styrene-isoprene block copolymer and the like; low-crystalline polybutadiene resin, ethylene-propylene elastomer, styrene-grafted ethylene-propylene elastomer, thermoplastic polyester elastomer, and ethylenic ionomer resin.

When the transparent resin material of this invention is mixed with a rubber-refinforced thermoplastic resin, an impact-resistant polymer composition can be obtained. Preferable examples of the rubber-reinforced thermoplastic resin include, for example, acrylonitrile-butadiene-styrene resin (ABS resin), acrylonitrile-ethylene-propylene-styrene resin (AES resin), methyl methacrylate-butadiene-styrene resin (MBS resin), acrylonitrile-butadiene-methyl methacrylate-styrene resin (ABMS resin), acrylonitrile-n-butyl acrylate-styrene resin (AAB resin) and rubber-modified polystyrene (high-impact polystyrene). These resins can be used alone or in combination of two or more.

When the transparent resin material of this invention is mixed with a ductile high polymer resin, an impact-resistant polymer composition can be obtained. The "ductile high polymer resin" refers to a high polymer resin having a brittle fracture-ductile fracture transition temperature of less than 25° C. Specific examples of the ductile high polymer resin includes a polycarbonate resin, a polyester resin, a polyamide resin, a polyethersulfone resin, a polysulfone resin and a polyimide resin.

When the transparent resin material of this invention is mixed with a brittle high polymer resin, a heat-resistant polymer composition can be obtained. The "brittle high polymer resin" refers to a high polymer resin having a brittle fracture-ductile fracture transition temperature of 25° C. or more. Specific examples of the brittle high polymer resin include a styrene resin, a vinyl chloride resin, an acrylic resin, a polyphenylene ether resin and a polyphenylene sulfide resin.

The above styrene resin includes a polystyrene, a polychlorostyrene, a poly-α-methylstyrene, a styrene-acrylonitrile copolymer, a styrene-methyl methacrylate copolymer, a styrene-maleic anhydride copolymer, a styrene-α-methylstyrene copolymer, a styrene-α-methylstyrene-methyl methacrylate terpolymer, a styrene-α-methylstyrene-acrylonitrile-methyl methacrylate quadripolymer, etc. These can be used alone or in combination of two or more.

The weight ratio of the ring opening (co)polymer and the other polymer to be mixed therewith is not critical but is preferably 10:90–90:10, more preferably 20:80–80:20, especially preferably 25:75–75:25 by weight.

The applications of the transparent resin material of this invention are not limited and the material can be in a wide field. It can be used as a molding material requiring ordinary transparency, in automobile parts, lighting appliances, electric parts, sundry goods, etc. Further, it can be especially preferably used as an optical material in which optical properties are important, for example, in lenses for ordinary camera, video camera, telescope, laser beam, etc. and optical disks such as optical video disk, audio disk, document file disk, memory disk, etc.

Since the transparent resin material of this invention consists of a polymer of a compound represented by the general formula (I), a copolymer of said compound and other copolymerizable monomer, or a hydrogenation product of said polymer or copolymer, it has excellent optical properties (i.e. high transparency and low birefringence), excellent heat resistance, high mechanical strengths, sufficient moisture resistance and good moldability.

This invention is described in more detail below referring to Examples. However, this invention is not restricted to these Examples.

EXAMPLE 1

To a nitrogen-purged reactor were fed 50 g of a monomer represented by the structural formula (1) appearing hereinafter (8-methoxycarbonyltetracyclo[$4.4.0.1^{2,5}.1^{7,10}$]-3-dodecene), 200 ml of 1,2-dichloroethane, 0.38 g of 1-hexene as a molecular weight modifier, and as a catalyst, 9.16 ml of a chlorobenzene solution containing 0.05 M/liter of $WCl_6$, 6.87 ml of a 1,2-dichloroethane solution containing 0.1 M/liter of paraldehyde and 3.7 ml of a toluene solution containing 0.5 M/liter of triisobutylaluminum, in a nitrogen atmosphere. The mixture was subjected to reaction at 60° C. for 10 hours to obtain 45 g of a polymer having an intrinsic viscosity ($n_{inh}$) of 0.78 dl/g as measured at 30° C. at a concentration of 0.5 g/dl in chloroform.

The polymer was press-molded at 300° C. to prepare test pieces. The test pieces were measured for glass transition temperature, water absorption and refractive index.

The test results are shown in Table 1.

EXAMPLE 2

The same procedure as in Example 1 was repeated, except that the monomer represented by the structural formula (1) was replaced by the same amount (50 g) of 8-methyl-8-methoxycarbonyltetracyclo[$4.4.0.1^{2,5}.1^{7,10}$]-3-dodecene represented by the structural formula (2) appearing hereinafter, to obtain 46 g of a polymer.

The polymer was subjected to the same pressmolding as in Example 1 to prepare test pieces. The test pieces were subjected to the same measurements as in Example 1.

The test results are shown in Table 1.

EXAMPLE 3

The same procedure as in Example 1 was repeated, except that the monomer of the structural formula (1) was replaced by 25 g of (A) 8-methoxycarbonyltetracyclo[4.4.0.1$^{2,5}$.1$^{7,10}$]-3-dodecene represented by the structural formula (1) and 25 g of (B) 5-methyl-5methoxycarbonylbicyclo[2.2.1]-2-heptene represented by the structural formula (3) appearing hereinafter, to obtain 44 g of a copolymer composed of 55 parts by weight of (A) and 45 parts by weight of (B).

The copolymer was subjected to the same pressmolding as in Example 1 to prepare test pieces. The test pieces were subjected to the same measurements as in Example 1.

The test results are shown in Table 1.

EXAMPLE 4

The same procedure as in Example 1 was repeated, except that the monomer of the structural formula (1) was replaced by 42.5 g of 8-methyl-8-methoxycarbonyltetracyclo[4.4.0.1$^{2,5}$.1$^{7,10}$]-3-dodecne represented by the structural formula (2) and 7.5 g of 5-methyl-5-cyclohexyloxycarbonylbicyclo[2.2.1]-2-heptene represented by the structural formula (7) appearing hereinafter, to obtain a polymer having an intrinsic viscosity of 0.68 dl/g.

The polymer was subjected to the same pressmolding as in Example 1 to prepare test pieces. The test pieces were subjected to the same measurements as in Example 1. The test results are shown in Table 1.

EXAMPLE 5

The same procedure as in Example 1 was repeated, except that the monomer of the structural formula (1) was replaced by 32.5 g of 8-methyl-8-methoxycarbonyltetracyclo[4.4.0.1$^{2,5}$.1$^{7,10}$]-3-dodecene of the structural formula (2) and 17.5 g of 5-methyl-5-(4'-t-butylcyclohexyloxy)carbonylbicyclo[2.2.1]-2-heptene of the structural formula (8) appearing hereinafter, to obtain a polymer having an intrinsic viscosity of 0.66 dl/g.

The polymer was subjected to the same pressmolding as in Example 1 to prepare test pieces The test pieces were subjected to the same measurements as in Example 1. The test results are shown in Table 1.

EXAMPLE 6

The same procedure as in Example 1 was repeated, except that the monomer of the structural formula (1) was replaced by 32.5 g of 8-methyl-8-methoxycarbonyltetracyclo[4.4.0.1$^{2,5}$.1$^{7,10}$]-3-dodecene represented by the structural formula (2) and 17.5 g of 8-methyl-8-n-butoxycarbonyltetracyclo[4.4.0.1$^{2,5}$.1$^{7,10}$]-3-dodecene represented by the structural formula (9) appearing hereinafter, to obtain a polymer having an intrinsic viscosity of 0.78 dl/g.

The polymer was subjected to the same pressmolding as in Example 1 to prepare test pieces. The test pieces were subjected to the same measurements as in Example 1. The test results are shown in Table 1.

EXAMPLE 7

The same procedure as in Example 1 was repeated, except that the monomer of the structural formula (1) was replaced by 37.5 g of 8-methyl-8-methoxycarbonyltetracyclo[4.4.0.1$^{2,5}$.1$^{7,10}$]-3-dodecene represented by the structural formula (2) and 12.5 g of 8-methyl-8-cyclohexyloxycarbonyltetracyclo[4.4.0.1$^{2,5}$.1$^{7,10}$]-3-dodecene represented by the structural formula (10) appearing hereinafter, to obtain a polymer having an intrinsic viscosity of 0.86 dl/g.

The polymer was subjected to the same pressmolding as in Example 1 to prepare test pieces. The test pieces were subjected to the same measurements as in Example 1. The test results are shown in Table 1.

EXAMPLE 8

The same procedure as in Example 1 was repeated, except that the monomer of the structural formula (1) was replaced by 20.0 g of 8-methyl-8-methoxycarbonyltetracyclo[4.4.0.1$^{2,5}$.1$^{7,10}$]-3-dodecene represented by the structural formula (2) and 30.0 g of 8-methyl-8-tricyclo[5.2.1.0$^{2,6}$]-8-decyloxycarbonyltetracyclo[4.4.0.1$^{2,5}$.1$^{7,10}$]-3-dodecene represented by the structural formula (11) appearing hereinafter, to obtain a polymer having an intrinsic viscosity of 0.83 dl/g.

The polymer was subjected to the same pressmolding as in Example 1 to prepare test pieces. The test pieces were subjected to the same measurements as in Example 1. The test results are shown in Table 1.

EXAMPLE 9

The same procedure as in Example 1 was repeated, except that the monomer of the structural formula (1) was replaced by 40 g of 8-methyl-8-methoxycarbonyltetracyclo[4.4.0.1$^{2,5}$.1$^{7,10}$]-3-dodecene represented by the structural formula (2) and 40 g of cyclopentene represented by the structural formula (12) appearing hereinafter, to obtain a polymer having an intrinsic viscosity of 0.68 dl/g.

The polymer was subjected to the same molding as in Example 1 to prepare test pieces. The test pieces were subjected to the same measurements as in Example 1. The test results are shown in Table 1.

COMPARATIVE EXAMPLE 1

Methyl methacrylate represented by the structural formula (4) appearing hereinafter was polymerized to obtain a polymethyl methacrylate having an intrinsic viscosity of 0.26 dl/g. The polymer was subjected to press-molding to prepare test pieces. The test pieces were subjected to the same measurements as in Example 1.

The test results are shown in Table 1.

COMPARATIVE EXAMPLE 2

8-Methyltetracyclo[4.4.0.1$^{2,5}$.1$^{7,10}$]-3-dodecene represented by the structural formula (6) appearing hereinafter and having no polar substituent was subjected to reaction in n-butanol (solvent) in the presence of ruthenium trichloride hydrate to synthesize a ring opening polymer. The polymer was subjected to the same pressmolding as in Example 1 to prepare test pieces. The test pieces were subjected to the same measurements as in Example 1. The test results are shown in Table 1.

COMPARATIVE EXAMPLE 3

A commercially available polycarbonate resin was subjected to the same press-molding as in Example 1 to prepare test pieces. The test pieces were subjected to the same measurements as in Example 1. The test results are shown in Table 1.

EXAMPLE 10

20 g of the polymer obtained in Example 1 was dissolved in 400 ml of toluene. Thereto were added 25 g of nickel naphthenate (nickel content: 5%) and 64 ml of a toluene solution containing 1 M/liter of triethylaluminum. Then, hydrogenation reaction was effected at 60° C. for 15 hours by feeding a hydrogen gas at a pressure of 50 kg/cm$^2$.

The resulting polymer was poured into a large excess of methanol acidified with hydrochloric acid, to decompose and remove the catalyst, after which the polymer was recovered and dried.

The polymer was press-molded at 300° C. to prepare test pieces. The test pieces were measured for properties. The test results are shown in Table 2.

EXAMPLE 11

The same procedure as in Example 1 was repeated, except that the monomer of the structural formula (1) was replaced by 50 g of 8-methyl-8-methoxycarbonyl-tetracyclo[4.4.0.1$^{2,5}$.1$^{7,10}$]-3-dodecene represented by the structural formula (2), to obtain a polymer having an intrinsic viscosity ($n_{inh}$) of 0.56 dl/g as measured at 30° C. at a concentration of 0.5 g/dl in chloroform. The polymer was hydrogenated in the same manner as in Example 10 to obtain a hydrogenated polymer.

The hydrogenated polymer was subjected to the same press-molding as in Example 10 to prepare test pieces. The test pieces were subjected to the same measurements as in Example 10.

The test results are shown in Table 2.

EXAMPLE 12

The same procedure as in Example 1 was repeated, except that the monomer of the structural formula (1) was replaced by 42.5 g of 8-methyl-8-methoxycarbonyl-tetracyclo[4.4.0.1$^{2,5}$.1$^{7,10}$]-3-dodecene represented by the structural formula (2) and 7.5 g of 5-methyl-5-cyclohexyloxycarbonylbicyclo[2.2.1]-2-heptene represented by the structural formula (7) appearing hereinafter, to obtain a polymer having an intrinsic viscosity of 0.73 dl/g.

50 g of the polymer was dissolved in 1,000 ml of tetrahydrofuran and hydrogenated at 120° C. for 7 hours at a hydrogen gas pressure of 140 kg/cm$^2$ using 1.0 g of a Rh/C catalyst (Rh concentration=2%) to obtain a hydrogenated polymer having a hydrogenation degree of 70%. The catalyst was removed by filtration, and the hydrogenated polymer was coagulated and recovered. The polymer was subjected to the same press-molding as in Example 10 to prepare test pieces. The test pieces were subjected to the same measurements as in Example 10. The test results are shown in Table 2.

EXAMPLE 13

The same procedure as in Example 1 was repeated, except that the monomer of the structural formula (1) was replaced by 40 g of 8-methyl-8-methoxycarbonyl-tetracyclo[4.4.0.1$^{2,5}$.1$^{7,10}$]-3-dodecene represented by the structural formula (2) and 40 g of cyclopentene represented by the structural formula (12), to obtain a polymer having an intrinsic viscosity of 0.74 dl/g.

The polymer was hydrogenated in the same manner as in Example 12 to prepare a hydrogenated polymer having a hydrogenation degree of 70%. The hydrogenated polymer was subjected to the same press-molding as in Example 10 to prepare test pieces. The test pieces were subjected to the same measurements as in Example 10. The test results are shown in Table 2.

COMPARATIVE EXAMPLE 4

The polymer obtained in Comparative Example 2 was hydrogenated in tetrahydrofuran (solvent) at a hydrogen gas pressure of 50 kg/cm$^2$ in the presence of a Pd/diatomaceous earth catalyst (Pd concentration=2%) to obtain a hydrogenated polymer having a hydrogenation degree of 90%. The catalyst was removed by filtration, and the hydrogenated polymer was coagulated and recovered. Then, the polymer was subjected to the same pressmolding as in Example 10 to prepare test pieces. The test pieces were subjected to the same measurements as in Example 10. The test results are shown in Table 2.

Structural formula (1)

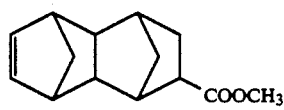

Structural formula (2)

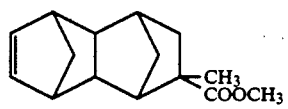

Structural formula (3)

Structural formula (4)

$$CH_2=\underset{\underset{CH_3}{|}}{C}-COOCH_3$$

Structural formula (5)

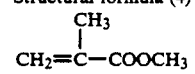

Structural formula (6)

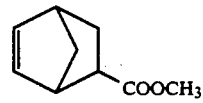

Structural formula (7)

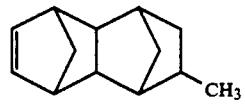

Structural formula (8)

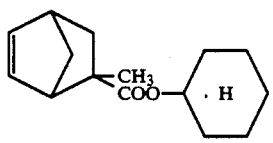

Structural formula (9)

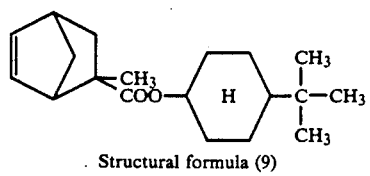

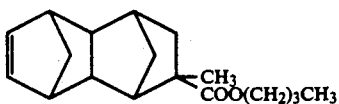

Structural formula (10)

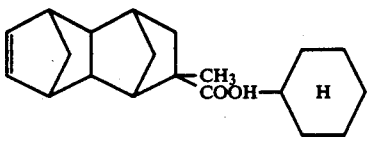

Structural formula (11)

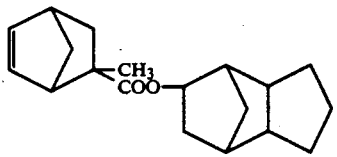

Structural formula (12)

the Karl Fischer method. The saturated water absorption of the test piece was calculated from the following formula.

$$\text{Saturated water absorption (\%)} = [W_2/(W_1 - W_2)] \times 100$$

Birefringence

Measured using an ellipsometer.

Adhesion

Aluminum was vapor-deposited on a resin substrate. Using a cutter, 100 squares each of 1 mm×1 mm were formed on the surface of the aluminum-deposited substrate, and these squares were subjected to a cellotape peeling test. When 10 or less squares were peeled, the adhesion of the resin substrate was indicated as ○ and, when 11 or more squares were peeled, the adhesion was indicated as X.

Hydrogenation degree

Using H-NMR spectrometry, there was measured the degree of the disappearance of the olefinic proton of a test piece polymer.

Photodeterioration

TABLE 1

| | Glass transition temperature (°C.) | Saturated water absorption (%) | Light transmittance (%) | Birefringence (nm) | Adhesion |
|---|---|---|---|---|---|
| Example 1 | 206 | 0.55 | 87 | Below 20 | ○ |
| Example 2 | 220 | 0.40 | 88 | Below 20 | ○ |
| Example 3 | 165 | 0.58 | 87 | Below 20 | ○ |
| Example 4 | 175 | 0.35 | 90 | Below 20 | ○ |
| Example 5 | 142 | 0.30 | 90 | Below 20 | ○ |
| Example 6 | 151 | 0.35 | 88 | Below 20 | ○ |
| Example 7 | 170 | 0.33 | 90 | Below 20 | ○ |
| Example 8 | 135 | 0.25 | 90 | Below 20 | ○ |
| Example 9 | 165 | 0.35 | 90 | Below 20 | ○ |
| Comparative Example 1 | 100 | 2.00 | 93 | Below 20 | ○ |
| Comparative Example 2 | 205 | 0.10 | 90 | Below 20 | X |
| Comparative Example 3 | 138 | 0.60 | 88 | Above 100 | ○ |

TABLE 2

| | Hydrogenation degree (%) | Glass transition temperature (°C.) | Saturated water absorption (%) | Light transmittance (%) | Birefringence (nm) | Photo-deterioration | Adhesion |
|---|---|---|---|---|---|---|---|
| Example 10 | 80 | 172 | 0.50 | 88 | Below 20 | No | ○ |
| Example 11 | 80 | 188 | 0.35 | 90 | Below 20 | No | ○ |
| Example 12 | 70 | 154 | 0.32 | 90 | Below 20 | No | ○ |
| Example 13 | 70 | 146 | 0.30 | 89 | Below 20 | No | ○ |
| Comparative Example 4 | 90 | 185 | 0.15 | 90 | Below 20 | No | X |

In Tables 1 and 2, the properties of each test piece were measured according to the following methods:

Glass transition temperature

Measured at a temperature elevation rate of 10° C./min in a nitrogen atmosphere using a differential scanning calorimeter.

Saturated water absorption

A test piece was immersed in water in order to allow the test piece to absorb water. The weight $W_1$ of the test piece when the water absorption had reached an equilibrium was measured. This test piece was then heated to 200° C. in a dry nitrogen stream and the amount $W_2$ of water released thereby was determined according to A test piece of 1 mm in thickness was irradiated with a light from a carbon arc lamp for 100 hours, using a fadeometer. Then, the coloring of the test piece was examined.

EXAMPLE 14

A separable flask provided with a stirrer, a reflux condenser and a three-way stop-cock was purged with nitrogen gas. Therein were placed 100 parts by weight of 8-methyl-8-methoxycarbonyltetracyclo[4.4.0.1^{2,5}.1^{7,10}]-3-dodecene as a monomer, 12.1 parts by weight of 1-hexene as a molecular weight modifier and 400 parts by weight of n-butyl acetate as an organic solvent in a nitrogen stream. Further, thereto were added, as a catalyst, 1.7 parts by weight of a n-hexane solution containing 10% by weight of diethylaluminum chloride, 1.8 parts by weight of a chlorobenzene solution containing 2% by weight of tungsten hexachloride, and 0.1 part by weight of an n-butyl acetate solution containing 10% by weight of paraldehyde. The resulting mixture was subjected to metathesis ring opening polymerization at 60° C. for 5 hours. The conversion in this polymerization was 96%.

To the above ring opening polymer solution was added 100 parts by weight of an aqueous solution containing 20% by weight of triethanolamine, and the mixture was stirred. Then, the aqueous layer was separated. The resulting reaction mixture was placed in a pressure reactor. Thereto was added 10 parts by weight of an active carbon-supported palladium (palladium concentration=5%) as a hydrogenation catalyst, and hydrogenation reaction was effected at 150° C. for 4 hours at a hydrogen gas pressure of 10 kg/cm$^2$.

The resulting reaction mixture was cooled, the hydrogen gas was released, the hydrogenation catalyst was removed by filtration, and methanol was added to the filtrate to coagulate a hydrogenated polymer. The polymer was then dried and recovered.

The yield of the hydrogenated polymer in the hydrogenation reaction was about 100%. The hydrogenated polymer was measured for infrared absorption spectrum and NMR spectrum to determine the hydrogenation degree, which was 100%.

In the above procedure, the removal of the hydrogenation catalyst by filtration was smooth and there was no reduction in molecular weight of polymer due to hydrogenation.

EXAMPLE 15

Polymerization reaction and hydrogenation reaction were effected in the same manners as in Example 14, except that the n-butyl acetate as a solvent was replaced by a mixed solvent consisting of 80 parts by weight of n-butyl acetate and 20 parts by weight of cyclohexane. The polymer yield in the polymerization reaction was about 100%, the hydrogenation degree in the hydrogenation reaction was 100%, and there was no decomposition of n-butyl acetate.

EXAMPLE 16

Polymerization reaction and hydrogenation reaction were effected in the same manners as in Example 14, except that the n-butyl acetate as a solvent was replaced by cyclohexane. The polymer yield in the polymerization reaction was about 100%, the hydrogenation degree in the hydrogenation reaction was 100%, and there was no decomposition of cyclohexane.

EXAMPLE 17

Polymerization reaction and hydrogenation reaction were effected in the same manners as in Example 14, except that the n-butyl acetate as a solvent was replaced by dibutyl ether. The polymer yield in the polymerization reaction was about 100%, the hydrogenation degree in the hydrogenation reaction was 100%, and there was no decomposition of dibutyl ether.

EXAMPLE 18

Polymerization reaction and hydrogenation reaction were effected in the same manners as in Example 14, except that the n-butyl acetate as a solvent was replaced by 1,2-diethoxyethane. The polymer yield in the polymerization reaction was about 100%, the hydrogenation degree in the hydrogenation reaction was 100%, and there was no decomposition of 1,2-diethoxyethane.

EXAMPLE 19

Polymerization reaction and hydrogenation reaction were effected in the same manners as in Example 14, except that the n-butyl acetate as a solvent was replaced by methoxyethyl acetate. The polymer yield in the polymerization reaction was about 100%, the hydrogenation degree in the hydrogenation reaction was 100%, and there was no decomposition of methoxyethyl acetate.

EXAMPLE 20

Polymerization reaction and hydrogenation reaction were effected in the same manners as in Example 14, except that the n-butyl acetate as a solvent was replaced by ethoxyethyl acetate. The polymer yield in the polymerization reaction was about 100%, the hydrogenation degree in the hydrogenation reaction was 100%, and there was no decomposition of ethoxyethyl acetate.

EXAMPLE 21

To a nitrogen-purged reactor were fed 1,760 g of 8-methyl-8-methoxycarbonyltetracyclo[4.4.0.1$^{2,5}$.1$^{7,10}$]-3-dodecene, 5,280 g of 1,2-dichloroethane and 190 g of 1-hexene as a molecular weight modifier. Thereto were further added 30 ml of a chlorobenzene solution containing 0.05 mol/liter of WCl$_6$, 15 ml of a 1,2-dichloroethane solution containing 0.1 mol/liter of paraldehyde and 47 ml of a n-hexane solution containing 80 mol/liter of diethylaluminum chloride. The mixture was subjected to reaction at 60° C. for 5 hours to obtain a polymer solution.

The conversion of the monomer to the polymer was 97.5%. The polymer had an intrinsic viscosity of 0.87 dl/g as measured at 30° C. at a concentration of 0.5 g/dl in chloroform.

To 100 parts by weight of the above polymer solution was added 100 parts by weight of a 1% by weight aqueous acetic acid solution. The mixture was vigorously stirred at room temperature for 10 minutes with a homomixer and then allowed to stand, whereby the organic layer was separated from the aqueous layer. The aqueous layer was discarded. The organic layer was washed with water, a 1% by weight aqueous sodium carbonate solution and water in this order and repeating this washing procedure.

The resulting polymer solution was concentrated to dryness to obtain a polymer. The concentrations of tungsten, aluminum and chlorine in the polymer were determined. The glass transition temperature (Tg) of the obtained resin was measured. The results are shown in Table 3.

EXAMPLE 22

The same procedure as in Example 21 was repeated, except that the 100 parts by weight of a 1% by weight aqueous acetic acid solution was replaced by 200 parts by weight of a 5% by weight aqueous acetic acid solution. The results are shown in Table 3.

EXAMPLE 23

The same procedure as in Example 21 was repeated, except that the 100 parts by weight of a 1% by weight aqueous acetic acid solution was replaced by 150 parts by weight of a 0.5% by weight aqueous acetic acid solution. The results are shown in Table 3.

EXAMPLE 24

The same procedure as in Example 21 was repeated, except that the 100 parts by weight of a 1% by weight aqueous acetic acid solution was replaced by 100 parts by weight of a 1% by weight aqueous oxalic acid solution. The results are shown in Table 3.

EXAMPLE 25

The same procedure as in Example 21 was repeated, except that the 100 parts by weight of a 1% by weight aqueous acetic acid solution was replaced by 250 parts by weight of a 1% by weight aqueous citric acid solution. The results are shown in Table 3.

Glass transition temperature (Tg)

Measured at a temperature elevation rate of 10° C./min in a nitrogen atmosphere according to differential scanning calorimetry.

EXAMPLE 26

To a nitrogen-purged reactor were fed 1,760 g of 8-methoxycarbonyltetracyclo[$4.4.0.1^{2,5}.1^{7,10}$]-3-dodecene, 5,280 g of toluene and 130 g of 1-hexene as a molecular weight modifier. Thereto was added, as a ring opening polymerization catalyst, 30 ml of a toluene solution containing 0.05 mol/liter of $WCl_6$, 15 ml of a toluene solution containing 0.1 mol/liter of paraldehyde and 47 ml of a n-hexane solution containing 0.8 mol/liter of diethylaluminum chloride. The mixture was

TABLE 3

| | Monomer used | De-catalyst agent | | | Residual metals and ions | | | $Tg^{*2}$ (°C.) | Color |
|---|---|---|---|---|---|---|---|---|---|
| | | Type | Concentration (%) | Amount used*1 (parts by weight) | W (ppm) | Al (ppm) | Cl (ppm) | | |
| Example 21 | Structural formula (2) | Acetic acid | 1 | 100 | 15 | 8 | 10 | 173 | Colorless and transparent |
| Example 22 | Structural formula (2) | Acetic acid | 5 | 200 | 10 | 12 | 20 | 173 | Colorless and transparent |
| Example 23 | Structural formula (2) | Acetic acid | 0.5 | 150 | 12 | 10 | 15 | 173 | Colorless and transparent |
| Example 24 | Structural formula (2) | Oxalic acid | 1 | 100 | 10 | 14 | 15 | 173 | Colorless and transparent |
| Example 25 | Structural formula (2) | Citric acid | 1 | 250 | 15 | 12 | 25 | 173 | Colorless and transparent |

Note:
*1 Amount per 100 parts by weight of polymer solution
*2 Glass transition temperature of recovered polymer In Examples 21 to 25, measurements were made according to the following methods.

Intrinsic viscosity

The viscosity of a chloroform solution containing 0.5 g/dl of a sample polymer was measured at 30° C.

Monomer conversion

A given amount of a polymer solution produced from a known amount of a monomer charged was poured into a large excess of methanol to coagulate a polymer. The polymer was recovered and weighed. The conversion of the monomer was calculated from the polymer weight.

Tungsten concentration

An accurately weighed polymer was decomposed with concentrated sulfuric acid and hydrogen peroxide. The solution containing residual metals was subjected to dithiol absorptiometry, whereby the tungsten concentration in the polymer was determined.

Aluminum concentration

A tetrahydrofuran (THF) solution of an accurately weighed polymer was subjected to atomic absorption spectrometry, whereby the aluminum concentration in the polymer was determined.

Chlorine concentration

Determined according to fluorescent X-ray analysis.

subjected to polymerization reaction at 50° C. for 5 hours. To the reaction mixture was added 7 liters of an aqueous solution containing 350 g of triethanolamine, and the mixture was stirred to extract the catalyst into the aqueous phase. Then, the organic phase was subjected to steam stripping to remove the solvent and water simultaneously. The resulting solid was dried to obtain 1,670 g of a polymer.

The 1,670 g of polymer obtained was dissolved in 17 liters of tetrahydrofuran. Thereto was added 167 g of a palladium-alumina catalyst (palladium concentration=5%) as a hydrogenation catalyst. The mixture was subjected to hydrogenation reaction at 165° C. for 5 hours at a hydrogen gas pressure of 10 kg/cm². After the completion of the reaction, the hydrogenation catalyst was removed from the reaction mixture to obtain a polymer solution (hereinafter referred to as Polymer Solution A). The hydrogenation degree of the polymer in this hydrogenation reaction was 100%.

5 Liters of Polymer Solution A was added to 50 liters of a mixed solvent consisting of 40 parts by volume of tetrahydrofuran and 60 parts by volume of methanol, in one hour with stirring, whereby a solid was coagulated. The solid was collected by filtration, and the resulting polymer was added to 5 liters of methanol and heated for 6 hours under reflux. The solid was separated by filtration and dried to recover a polymer.

The polymer was then measured for properties. The results are shown in Table 4. Glass transition temperature was measured by a differential scanning calorimeter. Mw/Mn is a ratio of a weight-average molecular weight Mw to a number-average molecular weight Mn. The content of low-molecular weight polymer is a content of low-molecular weight polymers having a molecular weight of 3000 or less. Molecular weight was determined by gel permeation chromatography.

The above polymer was molded to obtain a molded article having a Dynstat impact strength of 1,600 kg/cm². The article contained no foam and had a smooth surface with no adhesion.

EXAMPLE 27

The same procedure as in Example 26 was repeated, except that the mixed solvent was replaced by a mixed solvent consisting of 30 parts by volume of tetrahydrofuran and 70 parts by volume of methanol, to recover a polymer. The properties of this polymer and the molded article produced therefrom are shown in Table 4. The molded article contained no foam and had a smooth surface with no adhesion.

EXAMPLE 28

The same procedure as in Example 26 was repeated, except that the mixed solvent was replaced by a mixed solvent consisting of 20 parts by volume of tetrahydrofuran and 80 parts by volume of methanol, to recover a polymer. The properties of this polymer and the molded article produced therefrom are shown in Table 4. The molded article contained no foam and had a smooth surface with no adhesion.

EXAMPLE 29

The same procedure as in Example 26 was repeated, except that the mixed solvent was replaced by a mixed solvent consisting of 10 parts by volume of tetrahydrofuran and 90 parts by volume of methanol, to recover a polymer. The properties of this polymer and the molded article produced therefrom are shown in Table 4. The molded article contained no foam and had a smooth surface with no adhesion.

EXAMPLE 30

A polymer solution was obtained by repeating the same procedure as in Example 26, except that the tetrahydrofuran as a hydrogenation solvent was replaced by n-butyl acetate (said polymer solution is hereinafter referred to as Polymer Solution B). The hydrogenation degree of this polymer was 100%.

A polymer was recovered by repeating the same procedure as in Example 26, except that a mixed solvent consisting of 60 parts by volume of n-butyl acetate and 40 parts by volume of methanol was used for 5 liters of Polymer Solution B. The properties of this polymer and the molded article produced therefrom are shown in Table 4. The molded article contained no foam and had a smooth surface with no adhesion.

TABLE 4

| | Mixed solvent | | Glass transition temperature (°C.) | Mw/Mn | Content of low-molecular weight polymer (%) | Concentration of residual monomer (ppm) | Dynstat impact strength (kg/cm²) | Molded article | |
|---|---|---|---|---|---|---|---|---|---|
| | Composition*¹ | Volume ratio | | | | | | Foam | Surface adhesion |
| Example 26 | THF/MeOH | 40:60 | 174 | 3.91 | 0 | 200 | 1600 | No | No |
| Example 27 | THF/MeOH | 30:70 | 174 | 4.02 | 0 | 240 | 1400 | No | No |
| Example 28 | THF/MeOH | 20:80 | 174 | 4.21 | 0 | 260 | 1300 | No | No |
| Example 29 | THF/MeOH | 10:90 | 173 | 4.31 | 0 | 280 | 1100 | No | No |
| Example 30 | BuAc/MeOH | 40:60 | 174 | 3.55 | 0 | 200 | 1600 | No | No |

*¹THF = Tetrahydrofuran, MeOH = Methanol, BuAc = n-Butyl acetate

EXAMPLES 31–41 AND COMPARATIVE EXAMPLES 5–15

The ring opening polymer of this invention, that is, the poly(3,5-(8-methyl-8-methoxycarbonyltricyclo[5.2.1.0$^{2,6}$]decylene)ethylene) (hereinafter referred to as "A Polymer") produced in Example 26 or the poly(3,5-(8-methyl-8-ethoxycarbonyltricyclo[5.2.1.0$^{2,6}$]decylene)ethylene) (hereinafter referred to as "B polymer") produced by repeating the same procedure as in Example 26, except that 1760 g of 8-ethoxycarbonyltetracyclo[4.4.0.1$^{2,5}$.1$^{7,10}$]-3-dodecene was substituted for the starting material, was mixed with other polymer to prepare various compositions. The compositions were measured for properties. The results are shown in Table 5.

TABLE 5

| | Ring opening polymer | | Other polymer | | Tensile strength (Kg/cm²) | Elongation at break (%) | Dynstat impact strength (Kg/cm²) | Heat distortion temperature (°C.) |
|---|---|---|---|---|---|---|---|---|
| | Type | Amount | Type | Amount | | | | |
| Example 31 | A | 85 | Styrene-butadiene block copolymer*¹ | 15 | 470 | 160 | 1540 | — |
| Example 32 | B | 80 | Polybutadiene resin*² | 20 | 470 | 160 | 1650 | — |
| Comparative Example 5 | — | — | Stryrene-butadiene block copolymer*¹ | 100 | 280 | 800 | Above 2500 | — |
| Comparative Example 6 | — | — | Polybutadiene resin*² | 100 | 110 | 700 | Above 2500 | — |
| Example 33 | A | 50 | ABS resin*³ | 50 | 560 | 46 | 1070 | — |
| Comparative Example 7 | — | — | ABS resin*³ | 100 | 530 | 54 | 970 | — |
| Example 34 | A | 75 | Polycarbonate | 25 | 680 | 45 | 900 | — |
| Example 35 | A | 75 | Polybutylene terephthalate | 25 | 610 | 110 | 810 | — |
| Example 36 | A | 75 | Polyarylate | 25 | 675 | 120 | 1200 | — |
| Example 37 | A | 75 | Polyamide (nylon 6) | 25 | 665 | 65 | 780 | — |
| Comparative Example 8 | — | — | Polycarbonate | 100 | 715 | 85 | 1900 | — |
| Comparative Example 9 | — | — | Polybutylene terephthalate | 100 | 560 | 300 | 1550 | — |
| Comparative | — | — | Polyarylate | 100 | 770 | 110 | 1850 | — |

TABLE 5-continued

| | Ring opening polymer | | Other polymer | | Tensile strength | Elongation at break | Dynstat impact strength | Heat distortion temperature |
|---|---|---|---|---|---|---|---|---|
| | Type | Amount | Type | Amount | (Kg/cm²) | (%) | (Kg/cm²) | (°C.) |
| Example 10 Comparative Example 11 | — | — | Polyamide (nylon 6) | 100 | 720 | 115 | 1350 | — |
| Example 38 | A | 15 | Polystyrene | 85 | 550 | 3 | — | 106 |
| Example 39 | A | 15 | Styrene-methyl methacrylate copolymer | 85 | 565 | 3 | — | 106 |
| Example 40 | A | 15 | Polyvinyl chloride | 85 | 550 | 3 | — | 89 |
| Example 41 | B | 35 | Styrene-acrylonitrile copolymer | 65 | 650 | 3 | — | 117 |
| Comparative Example 12 | — | — | Polystrene | 100 | 540 | 3 | — | 96 |
| Comparative Example 13 | — | — | Styrene-methyl methacrylate copolymer | 100 | 570 | 4 | — | 95 |
| Comparative Example 14 | — | — | Polyvinyl chloride | 100 | 550 | 3 | — | 75 |
| Comparative Example 15 | — | — | Styrene-acylonitrile copolymer | 100 | 750 | 4 | — | 94 |

Note:
*¹TR2000, a product of Japan Synthetic Rubber Co., Ltd.
*²RB820, a product of Japan Synthetic Rubber Co., Ltd.
*³ABS No. 47, a product of Japan Synthetic Rubber Co., Ltd.

What is claimed is:

1. A process for producing a transparent resin material, comprising subjecting at least one compound represented by the general formula (I) or a combination of said compound and other copolymerizable monomer:

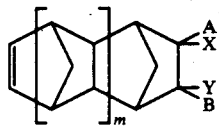 (I)

wherein A and B are independently hydrogen atoms or $C_{1-10}$ hydrocarbon group; X and Y are independently hydrogen atoms, $C_{1-10}$ hydrocarbon groups, halogen atoms, halogen-substituted $C_{1-10}$ hydrocarbon groups, $-(CH_2)_nCOOR^1$, $-(CH_2)_nOCOR^1$, $-(CH_2)_nOR^1$, $-(CH_2)_nCN$, $-(CH_2)_nCONR^2R^3$, $-(CH_2)_nCOOZ$, $-(CH_2)_nOCOZ$, $-(CH_2)_nOZ$ or $-(CH_2)_nW$ with the proviso that at least one of X and Y is selected from the above groups other than the hydrogen atom and the hydrocarbon groups, or X and Y may form together

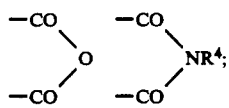

and m is 0 or 1 to ring opening polymerization in a solvent consisting of at least one compound selected from the group consisting of alkyl esters of saturated carboxylic acids wherein the sum total of the carbon atoms of the alkyl group due to the saturated carboxylic acid and those of the alkyl group due to the alcohol are 5–10, $C_{5-10}$ saturated alicyclic hydrocarbon compounds, $C_{4-10}$ acyclic monoether compounds, $C_{4-10}$ compounds having an ether bond and a carboxylic acid ester group in the molecule using a matethesis catalyst consisting of a combination of:

(a) at least one member selected from the group consisting of compounds of W, Mo and Re, and
(b) at least one member selected from the group consisting of compounds of elements of the Ia, IIa, IIb, IIIa, IVa and IVb groups of the Deming Periodic Table, and then hydrogenating the thus obtained (co)polymer at 0°–180° C. in a hydrogen gas atmosphere at atmospheric pressure to 300 atm. in the presence of a conventional hydrogenation catalyst in the same solvent as in the polyerization step.

2. The process according to claim 1, wherein the polymer solution after polymerization reaction is treated with an acidic solution of an organic acid compound to remove the catalyst.

3. The process according to claim 1, wherein the polymer solution is blended with a mixed solvent consisting of 5–50 parts by weight of a good solvent for the (co)polymer and 95–50 parts by weight of a poor solvent for the (co)polymer to recover a polymer.

4. The process according to claim 1, wherein the glass transition temperature of the (co)polymer is at least 100° C. and the saturated water absorption of the (co)polymer is 1.8% or less.

5. The process according to claim 1, wherein the glass transition temperature of the (co)polymer is at least 120° C.

6. The process according to claim 5, wherein the saturated water absorption of the (co)polymer is 1.2% or less.

7. The process according to claim 1, wherein at least 70% of the unsaturated bonds of the (co)polymer is hydrogenated.

8. The process according to claim 1, wherein the hydrogenation catalyst is a solid catalyst in which a catalyst substance selected from the group consisting of palladium, platinum, nickel, rhodium and ruthenium supported on a carrier selected from the group consisting of carbon, silica, alumina and titania or a homogeneous catalyst selected from the group consisting of nickel naphthenate/triethylaluminum, nickel acetylacetonate/triethylaluminum, cobalt octenoate/n-butyllithium, titanocene dichloride/diethylaluminum monochloride and rhodium catalysts.

9. The process according to claim 1, wherein the (a) component is selected from the halides, oxyhalides and alkoxyhalides of W and Mo and the (b) component is selected from $(CH_3)_3Al$, $(CH_3)_{12}AlCl$, $(CH_3)_3Al_2Cl_3$, $CH_3AlCl_2$, $(C_2H_5)_3Al$, $(C_2H_5)_2AlCl$, $(C_2H_5)_{1.5}AlCl_{1.5}$, $C_2H_5AlCl_2$, $(C_2H_5)_2AlH$, $(C_2H_5)_2AlOC_2H_5$, $(C_2H_5)_2AlCN$, $(C_3H_7)_3Al$, (iso-$C_4H_9)_3Al$, (iso-$C_4H_9)_2AlH$, $(C_6H_{13})_3Al$, $(C_8H_{17})_3Al$ and $(C_6H_5)_5Al$.

10. The process according to claim 8, wherein the proportion of the component (a) to the component (b) is 1:1–1:20.

* * * * *